US012133508B2

(12) United States Patent
Bedell et al.

(10) Patent No.: US 12,133,508 B2
(45) Date of Patent: *Nov. 5, 2024

(54) AUTOMATIC ZONE BOUNDARY ADJUSTMENT

(71) Applicant: Alarm.com Incorporated, Tysons, VA (US)

(72) Inventors: Jeffrey A. Bedell, Arlington, VA (US); Abraham Joseph Kinney, Vienna, VA (US); Jace Jawn Bauer, Houston, TX (US); Robert Nathan Picardi, Herndon, VA (US); Matthew Daniel Correnti, Newtown Square, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,634

(22) Filed: May 17, 2023

(65) Prior Publication Data
US 2023/0284590 A1   Sep. 14, 2023

Related U.S. Application Data

(63) Continuation of application No. 17/478,060, filed on Sep. 17, 2021, now Pat. No. 11,684,039, which is a (Continued)

(51) Int. Cl.
*G08B 21/02*   (2006.01)
*A01K 11/00*   (2006.01)
(Continued)

(52) U.S. Cl.
CPC .......... *A01K 11/008* (2013.01); *A01K 15/023* (2013.01); *A01K 27/009* (2013.01);
(Continued)

(58) Field of Classification Search
CPC .............. A01K 29/005; G08B 21/0269; G08B 21/0286; G08B 21/0288
See application file for complete search history.

(56) References Cited

U.S. PATENT DOCUMENTS

| 4,771,735 A | 9/1988 | Larsen |
| 5,987,379 A | 11/1999 | Smith |

(Continued)

FOREIGN PATENT DOCUMENTS

| CN | 202602813 | 12/2012 |
| WO | WO2009105243 | 8/2009 |

OTHER PUBLICATIONS

PCT International Search Report and Written Opinion in International Application No. PCT/US2019/020104, dated May 16, 2019, 15 pages.

(Continued)

*Primary Examiner* — John A Tweel, Jr.
(74) *Attorney, Agent, or Firm* — Fish & Richardson P.C.

(57) ABSTRACT

Systems and techniques are described for pet monitoring during unattended delivery. In some implementations, a monitoring system monitors a property includes sensors located throughout the property and generates sensor data. A monitor control unit receives a first indication that a resident of the property will be receiving a delivery during a delivery time. Based on the sensor data and during the delivery time, the monitor control unit determines that a pet, that resides at the property, has been restrained. The monitor control unit provides, to a delivery person, a second indication that the pet at the property has been restrained.

20 Claims, 6 Drawing Sheets

Related U.S. Application Data continuation of application No. 16/289,249, filed on Feb. 28, 2019, now Pat. No. 11,122,774.

(60) Provisional application No. 62/636,499, filed on Feb. 28, 2018.

(51) Int. Cl.
    | | |
    |---|---|
    | *A01K 15/02* | (2006.01) |
    | *A01K 27/00* | (2006.01) |
    | *A01K 29/00* | (2006.01) |
    | *G01S 5/00* | (2006.01) |
    | *G01S 19/14* | (2010.01) |
    | *H04N 7/18* | (2006.01) |

(52) U.S. Cl.
    CPC .......... *A01K 29/005* (2013.01); *G01S 5/0027* (2013.01); *G01S 19/14* (2013.01); *G08B 21/0269* (2013.01); *G08B 21/0286* (2013.01); *G08B 21/0288* (2013.01); *H04N 7/18* (2013.01); *H04N 7/181* (2013.01)

(56) References Cited

U.S. PATENT DOCUMENTS

| | | | |
|---|---|---|---|
| 7,868,756 B2* | 1/2011 | Maier ................... | G06Q 10/00 340/539.2 |
| 8,448,607 B2 | 5/2013 | Giunta | |
| 8,624,743 B2 | 1/2014 | Langer et al. | |
| 8,908,034 B2 | 12/2014 | Bordonaro | |
| 9,173,380 B2 | 11/2015 | Trenkle et al. | |
| 9,642,340 B2 | 5/2017 | Brown, Jr. et al. | |
| 9,652,912 B2 | 5/2017 | Fadell et al. | |
| 9,668,459 B2 | 6/2017 | Bonge, Jr. | |
| 9,693,536 B1 | 7/2017 | Dana | |
| 9,786,141 B2 | 10/2017 | Grabham | |
| 10,342,218 B1 | 7/2019 | Landers et al. | |
| 10,497,235 B1* | 12/2019 | Rogers ............. | G08B 13/19691 |
| 10,510,035 B2 | 12/2019 | Fadell et al. | |
| 10,643,079 B2 | 5/2020 | Li et al. | |
| 10,650,652 B1* | 5/2020 | Weingart ............... | G08B 13/22 |
| 10,782,681 B1 | 9/2020 | Slavin | |
| 11,044,889 B1 | 6/2021 | Rogers | |
| 11,122,774 B2 | 9/2021 | Bedell et al. | |
| 11,250,270 B1 | 2/2022 | Li et al. | |
| 11,372,077 B2 | 6/2022 | Seltzer et al. | |
| 11,622,275 B2* | 4/2023 | Gulick, Jr. ............. | H04W 4/80 455/411 |
| 11,684,039 B2* | 6/2023 | Bedell ................ | G08B 21/0288 119/719 |
| 2002/0096120 A1 | 7/2002 | Busha | |
| 2002/0147919 A1 | 10/2002 | Gentry | |
| 2008/0223300 A1 | 9/2008 | Kates | |
| 2009/0164277 A1 | 6/2009 | Bhattacharya | |
| 2009/0267829 A1 | 10/2009 | Mitchell et al. | |
| 2014/0180959 A1 | 6/2014 | Gillen et al. | |
| 2015/0112885 A1 | 4/2015 | Fadell et al. | |
| 2015/0120598 A1 | 4/2015 | Fadell et al. | |
| 2015/0242811 A1 | 8/2015 | Gillen et al. | |
| 2016/0042621 A1 | 2/2016 | Hogg et al. | |
| 2016/0247344 A1 | 8/2016 | Eichenblatt | |
| 2016/0302393 A1 | 10/2016 | Pradeep et al. | |
| 2017/0265432 A1 | 9/2017 | Anderton et al. | |
| 2017/0360004 A1 | 12/2017 | Carver | |
| 2018/0262875 A1* | 9/2018 | Inoue ................... | H04W 16/00 |
| 2019/0035187 A1 | 1/2019 | Kim et al. | |
| 2022/0304276 A1* | 9/2022 | Franco ................. | G08B 21/18 |

OTHER PUBLICATIONS

PCT International Preliminary Report on Patentability in International Application No. PCT/US2019/020104, dated Sep. 10, 2020, 9 pages.
CA Office Action in Canadian Appln. No. 3,092,630, dated Sep. 8, 2021, 6 pages.
CA Office Action in Canadian Appln. No. 3,092,630, dated Jun. 3, 2022, 4 pages.
EP Office Action in European Appln. No. 19711210.5, dated Sep. 23, 2022, 7 pages.
CA Office Action in Canadian Appln. 3,092,630, dated Mar. 28, 2023, 7 pages.
AU Examination Report in Australian Appln. No. 2019227915, dated Sep. 29, 2023, 3 pages.
Office Action in Australian Appln. No. 2019227915, mailed Apr. 3, 2024, 3 pages.
Office Action in Canadian Appln. No. 3,092,630, mailed Jan. 18, 2024, 13 pages.

* cited by examiner

300

```
┌─────────────────────────────────────────────────────────────────────┐
│  Receive an indication that a resident will be receiving a delivery │
│                                                                 302 │
└─────────────────────────────────────────────────────────────────────┘
                                    │
                                    ▼
┌─────────────────────────────────────────────────────────────────────┐
│ Determine that the resident will likely be away from the property   │
│ during an expected delivery time                                    │
│                                                                 304 │
└─────────────────────────────────────────────────────────────────────┘
                                    │
                                    ▼
┌─────────────────────────────────────────────────────────────────────┐
│ Provide an indication to the resident to restrain pet in response   │
│ to determining the resident will likely be away from the property   │
│ during the expected delivery time                                   │
│                                                                 306 │
└─────────────────────────────────────────────────────────────────────┘
                                    │
                                    ▼
┌─────────────────────────────────────────────────────────────────────┐
│ Receive an indication from the resident that the pet has been       │
│ properly secured at the property                                    │
│                                                                 308 │
└─────────────────────────────────────────────────────────────────────┘
                                    │
                                    ▼
┌─────────────────────────────────────────────────────────────────────┐
│ Provide an indication to a delivery person that the pet has been    │
│ restrained in response to detecting that the delivery person is     │
│ within proximity to the property                                    │
│                                                                 310 │
└─────────────────────────────────────────────────────────────────────┘
```

```
┌─────────────────────────────────────────────────────────────────────┐
│ Receive an indication that a resident will be receiving a delivery  │
│ at a monitored property                                             │
│                                                                 402 │
└─────────────────────────────────────────────────────────────────────┘
                                    ↓
┌─────────────────────────────────────────────────────────────────────┐
│ Determine that a pet is located at the monitored property within a  │
│ temporary fence during an expected delivery time                    │
│                                                                 404 │
└─────────────────────────────────────────────────────────────────────┘
                                    ↓
┌─────────────────────────────────────────────────────────────────────┐
│ Determine a likelihood that the delivery to the monitored property  │
│ is imminent                                                         │
│                                                                 406 │
└─────────────────────────────────────────────────────────────────────┘
                                    ↓
┌─────────────────────────────────────────────────────────────────────┐
│ In response to determining the likelihood that the delivery is      │
│ imminent, adjust one or more boundaries of the temporary fence to   │
│ generate a safe zone that provides safe delivery and restricts pet  │
│ movement into the safe zone                                     408 │
└─────────────────────────────────────────────────────────────────────┘
                                    ↓
┌─────────────────────────────────────────────────────────────────────┐
│ Detect that a package has been delivered at the monitored property  │
│ through the safe zone                                               │
│                                                                 410 │
└─────────────────────────────────────────────────────────────────────┘
                                    ↓
┌─────────────────────────────────────────────────────────────────────┐
│ In response to detecting that the package has been delivered,       │
│ adjust the one or more boundaries of the temporary fence to remove  │
│ the safe zone from the monitored property                           │
│                                                                 412 │
└─────────────────────────────────────────────────────────────────────┘
```

FIG. 4

AUTOMATIC ZONE BOUNDARY ADJUSTMENT

CROSS-REFERENCE TO RELATED APPLICATIONS

This application is a continuation of U.S. application Ser. No. 17/478,060, filed Sep. 17, 2021, which is a continuation of U.S. application Ser. No. 16/289,249, filed Feb. 28, 2019, which claims the benefit of U.S. Provisional Application No. 62/636,499, filed Feb. 28, 2018. The complete disclosures of all of the above patent applications are hereby incorporated by reference in their entirety for all purposes.

TECHNICAL FIELD

This specification relates generally to pet monitoring during unattended delivery.

BACKGROUND

Many companies offer unattended deliveries to a residential area, such as a house or apartment, where the delivery person gains access to the residential area when the owner is not present in order to deliver packages within the residency. In some residential areas, pets are present and often unrestrained, posing a threat to the delivery person or simply disrupting the delivery process.

SUMMARY

Many companies offer a service for a delivery person to deliver mail to the property of an individual when the property is unattended. The service includes the delivery person gaining access to the property when the resident is not present and delivering the package within the residency. However, some complications arise when the home poses a threat to the delivery person or simply disrupts the delivery process. For example, some properties can include pets that are present and often unrestrained during the delivery person's unattended delivery. An unidentified intruder (e.g., the delivery person) can alarm some pets and may seek to attack the unidentified intruder, thus interrupting the delivery process. In order to avoid such complications, a home monitoring system can monitor the status of household pets using digital communication processes between the resident, the property, and the delivery person.

The subject matter of the present disclosure is related to techniques of an integrated security environment for monitoring pet status during an unattended delivery at a residential facility. The residential facility may include one or more pets, such as dogs, birds, cats, that require restraining during the unattended delivery of package at the residential facility. In addition, the integrated security environment can include one or more devices that properly monitor the status of the pets in order to provide an indication to the delivery person to indicate a safety level for entering the property to deliver the package.

In one general aspect, a method is performed by one or more computers of a monitoring system. The method includes receiving, by a monitoring system that is configured to monitor a property, a first indication that a resident of the property will be receiving a delivery during a delivery time; receiving, by the monitoring system, sensor data from a sensor that is located at the property; based on the sensor data, determining, by the monitoring system, that a pet, that resides at the property, has been restrained; providing, by the monitoring system and to a delivery person, a second indication that the pet at the property has been restrained.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, in response to providing, to the delivery person, the second indication that the pet at the property has been restrained, receiving a notification from the delivery person confirming that the pet in the property is restrained after the delivery person has arrived at the property; based on receiving the notification from the delivery person confirming that the pet in the property is restrained, storing the sensor data and data indicating a restrained pet; and updating a model or a rule used to determine whether a pet is restrained based on sensor data using the stored sensor data and the stored data indicating a restrained pet.

In some implementations, the method further includes wherein the sensor is a camera and the sensor data is image data, and comprising: determining that the pet has been restrained by: receiving, from a smart collar connected to the pet, smart collar data; and based on the smart collar data and the image data, determining that the pet has been restrained in the property.

In some implementations, the method further includes receiving data indicating that an additional pet resides at the property; and based on the image data and the smart collar data, determining that the pet and the additional pet have been restrained.

In some implementations, the method further includes receiving data indicating that an additional pet resides at the property; based on the image data and the smart collar data, determining that at least one of the pet and the additional pet have not been restrained; and providing, to the resident or the other resident of the property, a notification indicating that at least one of the pet or the additional pet have not been restrained.

In some implementations, the method further includes wherein the smart collar data comprises an identifier of the smart collar, a GPS coordinate of the smart collar, and an indication of whether the smart collar is attached to the pet.

In some implementations, the method further includes receiving a third indication that the resident of the property will be receiving an additional delivery during an additional delivery time; based on the sensor data, determining that no pets reside at the property; and providing, to the delivery person, a third indication that no pets reside at the property.

In some implementations, the method further includes determining that the pet is located within an electronic pet fence at the property during the delivery time; before the delivery time, adjusting a boundary of the electronic pet fence to generate a safe zone that restricts pet movement into the safe zone and that provides the delivery person access to the property; determining that the delivery person has accessed and vacated the property; and in response to determining that the delivery person has accessed and vacated the property, adjusting the boundary of the electronic pet fence to provide the pet access to the safe zone.

In some implementations, the method further includes receiving a third indication that the resident of the property will be receiving an additional delivery during an additional delivery time; based on the sensor data and before the delivery time, determining that the pet is not restrained; based on determining that the pet is not restrained, providing a notification to a smart collar of the pet to encourage the pet to vacate a safe zone that is defined by an electronic pet fence at the property, wherein the safe zone provided the delivery person access to the property; adjusting a boundary of the electronic pet fence to generate the safe zone; determining that the delivery person has accessed and vacated the property; and in response to determining that the delivery person has accessed and vacated the property, adjusting the boundary of the electronic pet fence to provide the pet access to the safe zone.

In some implementations, the method further includes wherein the notification provided to the smart collar comprises at least one of a vibration, a noise, and a shock.

In some implementations, the method further includes based on determining that the pet resides at the property, determining that the property will likely be unoccupied during the delivery time; and providing, to the resident or another resident of the property, an instruction to restrain the pet before the delivery time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for providing an alert based on a determination that a particular event related to the monitored pet status has occurred.

FIG. 4 is a flowchart of an example process for configuring an adjustable pet fence at a monitored property based on a determination that a particular event related to the monitored pet status has occurred.

DETAILED DESCRIPTION

Figure 1:
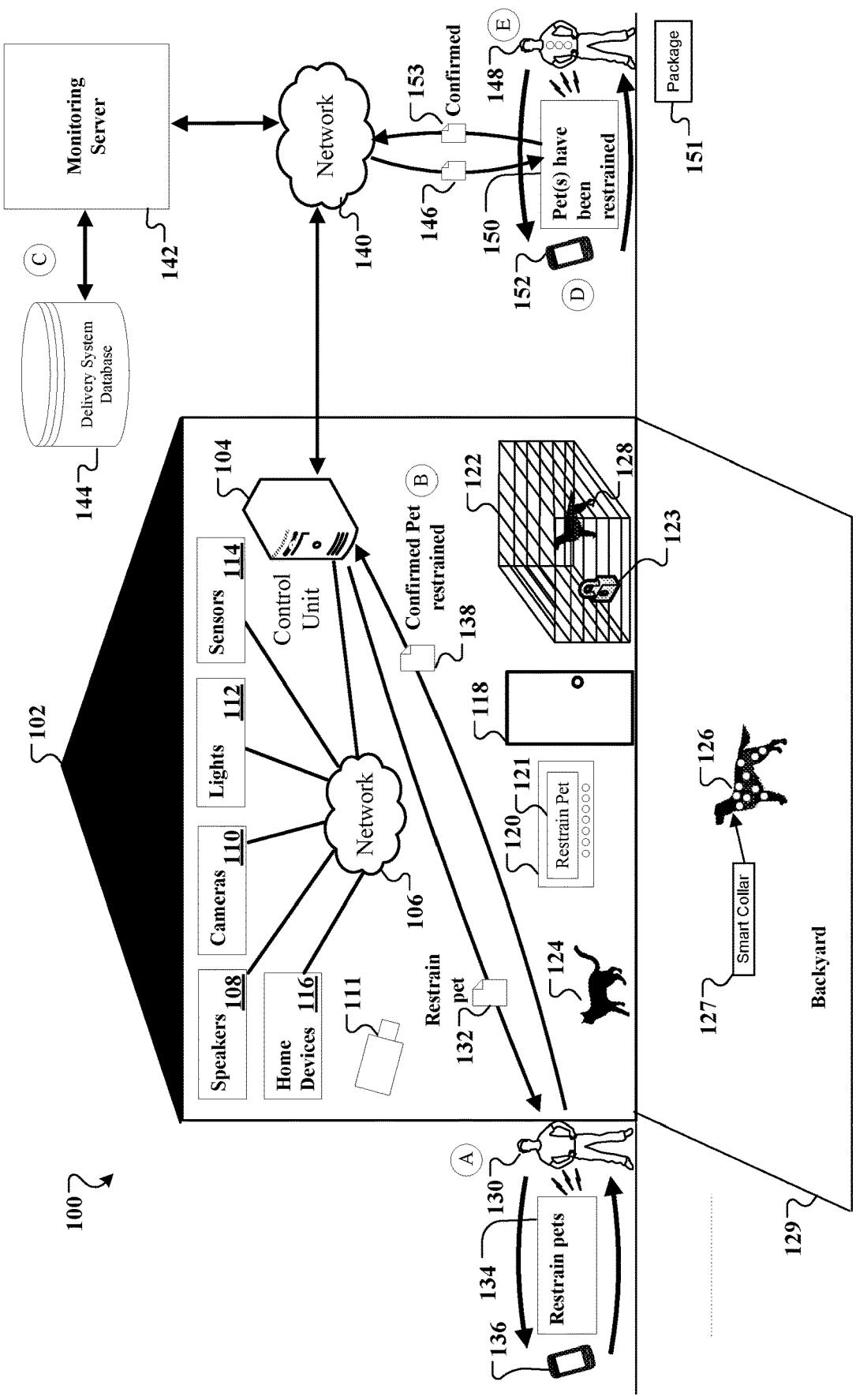
FIG. 1 is a contextual diagram of an example system of an integrated security environment for monitoring pet status during an unattended delivery.

FIG. 1 is a contextual diagram of an example system 100 of an integrated security environment for monitoring pet status during an unattended delivery. Though system 100 is shown and described including a particular set of components that include a control unit 104, network 106, speakers 108, cameras 110, lights 112, sensors 114, home devices 116, network 140, monitoring server 142, and delivery system database 144, the present disclosure need not be so limited. For instance, in some implementations only a subset of the aforementioned components may be used by the integrated security environment for monitoring pet status during an unattended delivery at the residential facility. As an example, there may be implementations that do not use the speakers 108. Similarly, there may be implementations that the monitoring server 142 is stored in one or more servers of the control unit 104. Yet other alternative exemplary systems also fall within the scope of the present disclosure such as a system that does not use a control unit server 104. For these reasons, the system 100 should not be viewed as limiting the present disclosure to any particular set of necessary components.

As shown in FIG. 1, residential facility 102 (e.g., a home) is monitored by various devices that communicate with a control unit server 104. For example, the residential facility 102 includes a control unit server 104 that includes components within the residential facility 102 for providing an alert to the property owner 130 and one or delivery individuals, such as delivery person 148. The components within the residential facility 102 may include one or more speakers 108, one or more cameras 110, one or more lights 112, one or more sensors 114, and one or more home devices 116. The one or more cameras 110 may include video cameras that are located at the exterior of the residential facility 102 near the front door 118, such as video camera 111, as well as located at the interior of the residential facility 102 near the front door 118. In addition, the video camera 111 may be placed at the exterior of the residential facility 102 facing the backyard 129 to monitor pets located in the backyard 129.

The one or more sensors 114 may include a motion sensor located at the exterior of the residential facility 102, a front door sensor that is a contact sensor positioned at the front door 118, and a lock sensor that is positioned at the front door 118. The contact sensor may sense whether the front door 118 is in an open position or a closed position. The lock sensor may sense whether the front door 118 is in an unlocked position or a locked position. The one or more home devices 116 may include home appliances such as a washing machine, a dryer, a dishwasher, an oven, a stove, a microwave, and a laptop, to name a few examples.

The residential facility 102 may further include a pet crate 122 and a smart crate lock 123. The crate 122 houses one or more of the pets, e.g. dog 128, cat 124, and/or other dog 126, for restraining purposes. The crate 122 includes a door mechanism to open and shut the crate 122. The crate 122 can be locked such that the one or more pets cannot enter or exit the crate 122.

In some implementations, the property owner 130 can lock the crate 122 with a lock, such as a smart crate lock 123. The smart crate lock 123 can provide an indication to the control unit server 104 that the crate 122 has been locked. Alternatively, the smart crate lock 123 can provide an indication to the control unit server 104 when the crate 122 has been unlocked. The smart crate lock 123 can provide the locked or unlocked indication to the control unit server 104 on a periodic basis. For example, the periodic basis may be on an hourly basis or a per minute basis. In some implementations, the control unit server 104 may only report the status of the smart crate lock 123 when the residential facility 102 has been armed, which will be further described below. In some implementations, the control unit server 104 may request for a status from the smart crate lock 123. The status can include a locked or unlocked status.

In some implementations, each of the one or more pets (e.g., cat 124, other dog 126, and dog 128) may wear a smart collar 127. The smart collar 127 can wrap around the neck or an appendage of each of the one or more pets. The control unit server 104 can communicate with each of the smart collars 127. Each smart collar 127 provides a status indication to the control unit server 104 that includes an identifier of the smart collar 127, a locked or unlocked status, and a GPS positional coordinate of the corresponding smart collar 127's location. The control unit server 104 can request for the status from each of the smart collar 127. In some implementations, the control unit server 104 can provide the status of each smart collar 127 to the client device 136 of the property owner 130. This will be further described below.

The control unit server 104 communicates over a short-range wired or wireless connection over network 106 with connected devices such as each of the one or more speakers 108, one or more cameras 110, one or more lights 112, one or more sensors 114a, one or more home devices 116 (washing machine, a dryer, a dishwasher, an oven, a stove, a microwave, a laptop, etc.), the smart crate lock 123, and the smart collar 127. The control unit server 104 seeks to receive sensor data descriptive of events detected by the one or more cameras 110, the one or more sensors 114, the one or more home devices 116, the smart crate lock 123, and the smart collar 127 in the residential facility 102.

In some implementations, the connected devices may connect via Wi-Fi, Bluetooth, or any other protocol used to communicate over network 106 to the control unit server 104. Additionally, the control unit server 104 communicates over a long-range wired or wireless connection with a monitoring server 142 over network 140 over one or more communication links. In some implementations, the monitoring server 142 is located remote from the residential facility 102, and manages the monitoring at the residential facility 102, as well as other (and, perhaps, many more) monitoring systems located at different properties that are owned by different users. In other implementations, the monitoring server 142 is located locally at the residential facility 102. The monitoring server 142 communicates bi-directionally with the control unit server 104. Specifically, the monitoring server 142 receives sensor data descriptive of events detected by the sensors included in the monitoring system of the residential facility 102. Additionally, the monitoring server 142 transmits instructions to the control unit server 104 for particular events.

In some implementations, the monitoring server 142 communicates with a delivery system database 144. The delivery system database 144 includes data corresponding to various delivery companies. For instance, the data corresponding to various delivery companies includes the name of the delivery company, contact information for the delivery company, and contact information for delivery persons of the delivery company. The monitoring server 142 can use the data provided in the delivery system database 144 to communicate with the delivery person 148. In some implementations, the monitoring server 142 may communicate with the delivery system database 144 over the Internet.

In the example shown in FIG. 1, a property owner 130 may place an order for delivery of a package using client device 136. The client device 136 may display a web interface, an application, or a device specific application for package ordering. The client device 136 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 136 may communicate with the control unit server 104 using the network 106 over one or more communication links. The network 106 may be wired or wireless or a combination of both and can include the Internet.

In some implementations, property owner 130 may communicate with the client device 136 to activate a signature profile for the residential facility 102. The client device 136 may display an interactive application for setting a signature profile of the smart home. For instance, property owner 130 may first instruct the control unit server 104 to set a signature profile corresponding to arming the home at the residential facility 102. For example, property owner 130 may use a voice command to say "Smart Home, arm home." The voice command may include a phrase, such as "Smart Home" to trigger the client device 136 to actively listen to a command following the phrase. Additionally, the phrase "Smart Home" may be a predefined user configured term to communicate with the client device 136. The client device 136 can send the voice command to the control unit server 104 over the network 106. The control unit server 104 may notify the monitoring server 142 that residential facility 102 is to arm the residential facility 102. In some implementations, the property owner 130 may communicate with a monitor 120 that includes a microphone to activate a signature profile for the residential facility 102. The monitor 120 performs similar functionality to the client device 136 for voice commands and communicates with the control unit server 104 for profile activation.

In addition, the control unit 104 may set associated parameters in response to receiving the voice command. Moreover, the control unit 104 can send back a confirmation to the client device 136 or monitor 120 in response to arming the residential facility 102 and setting the associated parameters. For example, the control unit server 104 may send back a response to display a message on the client device 136 that says "Smart Home, home armed."

In some implementations, the property owner 130 may set other signature profiles for the residential facility 102. For example, the other signature profiles may include monitoring pets, unarming the home, and unattended package delivery. In some implementations, in order for the control unit server 104 to allow property owner 130 and others to activate a signature profile for the residential facility 102, the property owner 130 and others may define and store signature profiles in the control unit 104. In other implementations, the property owner 130 and others may define and store signature profiles in the monitoring server 142. The signature profile may be associated with each user and allow for various use cases of the devices in the residential facility 102. Each of the signature profiles can be associated with one user, such as property owner 130. For example, property owner 130 may create a signature profile for monitoring the pets at the residential facility 102.

In the example shown in FIG. 1, various operations in stages (A) to (E) are illustrated which can be performed in the sequence indicated or in another sequence. The property owner 130 may own one or more pets, such as, a cat 124, a dog 128, and another dog 126, living in residential facility 102. The property owner 130 may receive a notification from the control unit server 104 to restrain each of his or her pets upon leaving the residential facility 102. Based on (i) a determination that the property owner 130 is set to receive a package later that day, (ii) a determination that each of the one or more pets are not currently restrained, and (iii) a determination that the property owner 130 is leaving residential facility 102, the control unit server 104 transmits an indication to the client device 136 to restrain each of the pets before leaving.

Once the property owner 130 restrains each of his or her pets, the property owner 130 provides an indication to the control unit server 104 that the pets have been restrained. In response, the control unit server 104 can provide an indication to the delivery company delivering the package that the pets at the residential facility 102 have been restrained. Additionally, the control unit server 104 provides the indication to a delivery person 148 of the delivery company delivering the package when the delivery person 148 is detected within proximity of the residential facility 102 that the pets of the residential facility 102 have been restrained. The control unit server 104 may then receive a notification from the delivery person 148 that indicates a confirmation that the pets in the residential facility 102 are indeed restrained. Alternatively, the control unit server 104 may receive a notification from the delivery person 148 that at least one of the pets of the residential facility 102 is not restrained. As a result, the delivery person 148 placed the package outside the front door 118 and indicates to the control unit server 104 that the package 151 is placed outside the front door 118. In response, the control unit server 104 may provide an indication to the property owner 130 indicating that one of the pets is not restrained.

During stage (A), the control unit server 104 provides an indication 132 to the client device 136 of the property owner 130 that indicates to restrain the one or more pets before leaving. The control unit server 104 provides this indication 132 to the client device 136 when the control unit server 104 identifies at least three qualifying conditions. Those qualifying conditions include: (i) a determination that the property owner 130 has left the residential facility 102, (ii) a determination that the property owner 130 is expected to receive a package on the same day the control unit server 104 determines that the property owner 130 has left the residential facility 102, and (iii) a determination that the one or more pets living in the residential facility 102 are not restrained.

For the first condition, the control unit server 104 can determine that property owner 130 has left the residential facility 102 using at least one of the following various ways. In particular, the control unit server 104 can receive an indication that the front door 118 has been opened, the property owner 130 has set the arm home signature profile, each of the home devices 116 have been turned off, the video camera 111 located outside the front door 118 detects movement, and the garage door for the residential facility 102 has opened. In some implementations, at least one of these qualifying events is sufficient to meet the condition that property owner 130 has left the residential facility 102. In other implementations, the control unit server 104 can utilize all of the indications to determine that the property owner 130 has left the residential facility 102.

In some implementations, the video camera 111 located outside the front door 118 may be able to detect that an individual, such as the property owner 130, is walking away from the residential property 102 using one or more machine learning algorithms. The one or more machine learning algorithms can include one or more neural networks that are trained to detect movement from humans or animals. The video camera 111 utilizes these machine-learning algorithms to detect human movement outside the residential facility 102. In response to detecting the human movement, the video camera 111 transmits the video footage and an indication of detected movement to the control unit server 104. After the control unit server 104 receives the video footage and the indication of detect movement, the control unit server 104 proceeds to check the next qualifying condition of whether the property owner 130 is expected to receive a package that same day.

In some implementations, the control unit server 104 can determine that property owner 130 is expected to receive a package 151. In particular, the control unit server 104 can determine if the property owner 130 placed an order for delivery of a package 151 through the property owner 130's smart home application on client device 136. In other implementations, the control unit server 104 can request a response from property owner 130 through client device 136 that asks if he/she is expecting to receive a package 151 today. In other implementations, the control unit server 104 can communicate with the delivery system database 144 over the network 140 and through the monitoring server 142 to determine if property owner 130 placed a delivery order for package 151 through any of the delivery companies. In addition, the control unit server 104 can determine from communicating with the delivery system database 144 whether any of the delivery companies plan to deliver a package to the residential facility 102. If the control unit server 104 determines that at least one delivery company plans to deliver a package 151 to the residential facility 102, the control unit server 104 can determine that the second qualifying condition is met. The control unit server 104 proceeds to check the last qualifying condition of whether the one or more pets living in the residential facility 102 are restrained.

In other implementations, the control unit server 104 can determine that the property owner 130 will be away from the residential property 102 during an expected delivery time. For instance, the control unit server 104 can determine that the property owner 130 is away from the residential property 102 during the times of 8:00 am and 4:00 pm during Monday through Friday. The control unit server 104 can determine that the property owner 130 sets the arm home signature profile at 8:00 am and turns off the arm home signature profile at 4:00 pm each day of the week. In addition, the control unit server 104 utilizes recognition software in the video camera 111 to determine that the property owner 130 is walking away from the residential facility 102 around 8:00 am and walks towards the residential facility 102 at 4:00 pm.

In some implementations, the property owner 130 can indicate to the control unit server 104 that he or she will be away from the residential facility 102. For instance, the property owner 130 can input in the smart home application on client device 136 that he or she will be away. In addition, the property owner 130 setting the arm home profile indicates to the control unit server 104 that the property owner 130 will be away from the residential facility 102.

In some implementations, the control unit server 104 can determine that a delivery company plans to deliver a package 151 to the residential facility 102 during a specified time of the day. For instance, the control unit server 104 can retrieve the contact information from the delivery system database 144 for the delivery company that plans to deliver the package 151 to the residential facility 102. The control unit server 104 can contact the delivery company using the delivery company's contact information (e.g., telephone number, email address, URL address, or other similar contact information) to request for a delivery time. In other implementations, the control unit server 104 can transmit a request to property owner 130's client device 136 to ascertain of the potential delivery time from the property owner 130. In some cases, the property owner 130 may be aware of the delivery time. In some implementations, the delivery company may transmit an indication to the control unit server 104 that they plan to deliver a package 151 to the residential property 102. As a result, the control unit server 104 may provide a notification to the client device 136 that indicates to the property owner 130 what package 151 is being delivered and an expected delivery time.

The control unit server 104 can determine whether the one or more pets living in the residential facility 102 are restrained at the specified time of delivery. For example, during the specified delivery time or before the specified delivery time is imminent, the control unit server 104 can turn the lights 112 on in each of the rooms in the residential facility 102 and request current video footage from cameras 110 located in the residential facility, such as video camera 111. The cameras 110 can be trained to detect and recognize one or more pets located in the residential facility 102 using recognition software during the delivery time. Additionally, the cameras 110 can be trained to detect one or more pets located outside the residential facility 102, such as in the backyard 129, the front yard, or the side yard. In some implementations, the cameras 110 can provide an indication of pet detection to the control unit server 104 along with the recorded video footage that shows the detected pet during the delivery time.

In some implementations, the pets may wear a smart collar 127 that wraps around the neck or one of the appendages of the pets. Each smart collar 127 can communicate with the control unit server 104 using either short-range or long-range communication protocols. Each smart collar 127 can provide a status indication to the control unit server 104 that includes an identifier of the smart collar 127, an indication of whether the collar is locked or unlocked around the neck or one of the appendages of the pets, and a GPS positional coordinate of the corresponding smart collar 127's location. The cat 124, the other dog 126, and the dog 128 can each wear a smart collar 127 that allows the property owner 130 and the control unit server 104 to track the status and location of each pet in the residential facility 102.

In some implementations, the control unit server 104 can direct the cameras 110 to the location of each smart collar 127. In particular, the control unit server 104 can transmit a request to each smart collar 127 for its respective location. Each smart collar 127 can transmit the status location to the control unit server 104. In response, the control unit server 104 can instruct each camera in the cameras 110 to point to a location in the residential facility 102 that corresponds to each respective location of the smart collar 127. In addition, the control unit server 104 can instruct each camera in the cameras 110 to record video at the respective location of the smart collar 127 for a predetermined period of time. For example, the period of time can include minutes to hours. The purpose of the control unit server 104's instruction is to use the cameras 110 and/or each smart collar 127 to determine whether each pet is currently restrained. In particular, the control unit server 104's instruction is to determine whether each pet is currently restrained during the delivery time of the delivery person 148.

In some implementations, the control unit server 104 can store a number of pets living in the residential facility 102 in its memory. In some implementations, the control unit server 104 can request for the property owner 130 to enter in a number of pets living in the residential facility 102 on the client device 136. For instance, the smart home application on the client device 136 provides a prompt for the property owner 130 to input a number of pets living in the residential facility 102. In response, the client device 136 transmits the number of pets entered in by the property owner 130 to store in memory in the control unit server 104.

In other implementations, the control unit server 104 can use the one or more machine learning algorithms implemented in the cameras 110 to learn how many pets exist in the residential facility 102. For example, the one or more machine learning algorithms implemented in the cameras 110 can detect each pet living in the residential facility 102 through video footage. As a result, each time a pet is detected in the video footage by the machine-learning algorithms, the control unit server 104 can store a corresponding number in its memory. The control unit server 104 can decipher from the video footage provided by the video cameras 110 if the detected pet is a new pet or a previously detected pet. If the control unit server 104 determines the detected pet is a new pet, the corresponding pet count number in memory is incremented.

In some implementations, the control unit server 104 instructs the camera 110 to activate in order to detect whether a pet is restrained. The control unit server 104 requests a camera, such as camera 111, to record in various locations of the residential facility 102 to determine whether a pet is restrained. The various locations may include the residential facility 102's backyard 129, a bedroom of the residential facility 102, the crate 122, a garage of the residential facility 102, and the basement of the residential facility 102. The residential facility 102 can include a camera 111 from cameras 110 pointing at each of these locations. When the control unit server 104 is in the process of determining whether each of the pets in the residential facility 102 is restrained, the control unit server 104 may request a status from each of the cameras 110 to indicate if the pet is restrained. For example, the control unit server 104 requests from each camera 111 pointed at the backyard, a bedroom of the residential facility 102 with the bedroom's door closed, the crate 122, a garage of the residential facility 102, and the basement of the residential facility 102 to provide an indication of whether a pet is located in that location. In other implementations, the control unit server 104 determines whether each of the pets in the various locations is restrained using recorded video footage from each of the cameras 110.

In some implementations, the control unit server 104 may receive an indication from a digital lock mechanism 123 to indicate whether a pet is restrained. For example, the digital lock mechanism 123 may be hooked on the crate 122 or on a pet door. The digital lock mechanism 123 can provide an indication of being locked or unlocked to the control unit server 104. Additionally, the digital lock mechanism 123 can provide the indication to the client device 136 of the property owner 130 to indicate whether the pet is restrained behind the digital lock mechanism 123. In some implementations, the control unit server 104 can request a status of the digital lock mechanism 123 to determine whether a pet, such as dog 128, is restrained. Additionally, the property owner 130 can request a status of the digital lock mechanism 123 using the client device 136 to determine whether the pet is still restrained either in the crate 122 or behind the pet door, depending on whether the digital lock mechanism 123 is attached to the crate 122 or the pet door. As will be further discussed below, the control unit server 104 can provide the status indication of the digital lock mechanism to the client device 152 of the delivery person 148. This will be helpful to in determining whether the delivery person 148 will feel safe in entering the residential property 102.

In some implementations, upon receiving an indication from each of the cameras 110 pointed at the various locations, the control unit server 104 counts the number of indications that indicate a pet exists at the various locations reported by the camera 110. For example, the control unit server 104 indicates a pet exists when the control unit server 104 determines a detected pet exists in the residential facility 102. Said another way, if five cameras 110 pointing at different locations in the residential facility 102 each detect an indication of a pet, then the control unit server 104 will count the number of pets in the residential facility 102 to be five.

The control unit server 104 then compares the count of the indications that the pet exists at the various locations to the number stored indicating the number of pets living in the residential facility 102. If the comparison returns a match, the control unit server 104 produces a status that indicates all the pets are restrained during the specified delivery time. For example, the other dog 126 may be found to be located in the backyard 129; the dog 128 may be found to be located in the crate 122, and the cat 124 located in property owner 130's bedroom. In addition, the control unit server 104 knows that three pets live in the residential facility 102. By comparison, the number of pets living in the residential facility 102 matches the number of pets found to be in locations that indicate the pet is restrained. Therefore, the control unit server 104 does not provide an indication to the client device 136 of the property owner 130. In other implementations, the control unit server 104 can count the number of statuses as locked provided by the smart collar 127 as the number of pets found in the residential facility 102.

In some implementations, the control unit server 104 may determine that the number of pets found in the restrained locations is less than the number of pets living in the residential facility 102. In particular, this comparison indicates to the control unit server 104 that at least one of the pets living in the residential facility 102 is unrestrained. As a result, the control unit server 104 can transmit a notification 132 to the client device 136 that provides a message 134 to the property owner 130. As illustrated in the example of FIG. 1, the message 134 indicates to the property owner 130 to "restrain all pets before leaving" on client device 136. In other implementations, the message 134 indicates to the property owner 130 to "restrain all pets as the package is expected to be delivered now" on client device 136. In other implementations, the control unit server 104 may determine which pet is unrestrained using facial and/or object recognition, and compare the results of the recognition to known pets living in the monitored property 102. Thus, the control unit server 104 can indicate to the property owner 130 to restrain a particular pet, such as dog 126, as the dog 126 is currently unrestrained and the delivery is imminent.

In some implementations, the control unit server 104 can provide a message 134 to client device 136 that indicates which pet needs to be restrained. For example, if the camera 111 facing the cage 122 does not detect a pet within the cage 122, the control unit server 104 can provide a message 134 that indicates to the property owner 130 to "restrain dog in cage" on client device 136. In some implementations, the control unit server 104 can provide the message 134 to the display 121 of monitor 120. By providing the message 134 to the display 121, the property owner 130 can receive the message 134 in other forms if their client device 136 is turned off or not nearby.

During stage (B), the property owner 130 provides an indication 138 to control unit 104 using client device 136 that all pets are restrained. The property owner 130 restrains each pet in either the backyard 129, the cage 122, a bedroom of the residential facility 102 and closes the bedroom door, or a garage of the residential facility 102. Once the property owner 130 properly restrains each of the pets, the property owner 130 interacts with the smart home application on the client device 136 to indicate that all of the pets are restrained. In particular, the client device 136 transmits a notification 138 that includes a message and a client device identifier to the control unit server 104.

In some implementations, the property owner 130 can provide an indication of a "no pets at home" status in the indication 138. The property owner 130 can provide the "no pets at home" status using the smart home application on the client device 136. The "no pets at home" status indicates that the residential facility 102 does include one or more pets but the pets are not present. For instance, the one or more pets may be at the veterinarian, out at the dog park, or at another individuals' residence. The "no pets at home" status indicates to the control unit server 104 that no pets will be found in the residential facility 102. In some implementations, the control unit server 104 or the monitoring system 142 can provide this "no pets at home" status to the delivery person 148 upon detecting his or her proximity to the residential facility 102 to indicate that it is safe to deliver the package. In other implementations, the control unit server 104 can use the smart collar 127 worn by each pet to determine the "no pets at home" status. For instance, the control unit server 104 is aware that at least three pets live in the house but cannot detect the signal from any of the smart collars 127. Additionally, to aid the control unit server 104 in distinguishing between determining whether the smart collars 127 are turned off or outside the residential facility 102, the control unit server 104 can transmit a request to the client device 136 to request for input from the property owner 130 for the location of each of the pets. The property owner 130 can then indicate on the client device 136 that the smart collars 127 are turned off or that the pets smart collars 127 are worn and the pets are not in the residential facility 102. In other implementations, the control unit server 104 can utilize video analytics from live or recorded video of the cameras 110 that indicate the location of the pets. The control unit server 104 can use recognition software in the video analytics that determines whether each of the pets left the residential facility 102 or still reside in the residential facility 102.

In some implementations, the property owner 130 can indicate on the client device 136 whether to provide video verification of the pet in the restrained state to the control unit server 104. For example, video camera 111 can record video of dog 128 restrained and locked in crate 122 by digital lock mechanism 123. The property owner 130 can indicate using the smart home application on the client device 136 that the video recording will not be provided to the control unit server 104. As such, the video recording of the dog 128 in the crate 122 will not be provided to the delivery person 148. Alternatively, the property owner 130 can indicate using the smart home application on the client device 136 that the video recording can be provided to the control unit server 104.

During stage (C), the control unit server 104 received the indication 138 from the client device 136 indicating that each of the pets have been restrained. In some implementations, the notification 138 can indicate to the control unit server 104 which pets were restrained. In addition, the notification 138 can indicate to the control unit server 104 a location where each pet is restrained. For instance, the property owner 130 can indicate that the other dog 126 is restrained in the backyard 129, the dog 128 is restrained in the crate 122, and the cat 124 is restrained in a bedroom. The control unit server 104 can store this information from the notification 138 in memory for later instruction to a delivery person 148. In particular, the later instruction to the delivery person 148 can indicate that the residential facility 102 is safe for entering.

In some implementations, the control unit server 104 can retrieve contact information for sending a verification to the delivery company indicating that the pets in residential facility 102 are restrained. The control unit server 104 can retrieve the contact information of the delivery company from the delivery system database 144 through the monitoring server 142. For instance, the control unit server 104 can transmit an indication to the monitoring server 142 that requests for the contact information from the delivery system database 144. The indication can include the name of the delivery company, the contact information of the property owner 130 receiving the package, and the address information of the residential facility 102. The monitoring server 142 uses this information provided in the indication to retrieve the contact information of the delivery company. For example, the contact information of the delivery company can include an e-mail address of the delivery company, an IP address to contact the delivery company, a website of the delivery company, and a telephone number of the delivery company.

The monitoring server 142 can provide an indication to the delivery company that the pets of residential facility 102 have all been restrained at the specified time of delivery. This indicates to the delivery company that the residential facility 102 is safe for the delivery person 148 to enter the residential facility 102 and deliver the package 151. In addition, the monitoring server 142 provides the contact information of the delivery person 148 delivering the package 151 to the control unit 104. For example, the contact information of the delivery person 148 can include a telephone number of the delivery person 148's mobile device 152 and an email address of the delivery person 148, to name a few examples. The control unit 104 can then contact the delivery person 148 to inform him or her that residential facility 102 has one or more pets and that the pets are in fact restrained.

During stage (D), the control unit 104 detects that the delivery person 148 is within proximity to the residential facility 102. For instance, the control unit 104 can receive an indication from the monitoring server 142 when the delivery person 148 is within proximity to the residential facility 102. The monitoring server 142 can remain in contact with the delivery company that provides an indication of an estimated arrival time for the delivery person 148 to arrive at the residential facility 102. Additionally, the delivery company may provide GPS positional information to the monitoring server 142 of the delivery person 148 so that the monitoring server 142 can track his or her location. In some implementations, the monitoring server 142 can provide the GPS positional information to the control unit server 104 for tracking the delivery person 148. For example, the GPS positional information can relate to latitudinal, longitudinal, and time information of client device 152 corresponding to the delivery person 148. Additionally or alternatively, the GPS positional information can be provided to the control unit server 104 or the monitoring server 142 during the entire path travelled by the delivery person 148 from the pickup of the package 151 to the residential facility 102. In some implementations, the delivery company can provide an indication directly to the client device 136 of the property owner 130 that indicates a real time location of the delivery person 148. In some implementations, the delivery person 148 may include a beacon or other transmitter that transmits an indication to the control unit server 104, the monitoring server 142, or the client device 136 that indicates the delivery person 148 arrived. In particular, the indication can be a beacon frame or another wireless ID identifier that signifies the presence of the delivery person 148.

In some implementations, the control unit server 104 can track the GPS positional information of the delivery person 148 to detect when the delivery person 148 is within proximity to the residential facility 102. For example, the control unit server 104 can use the GPS positional information of the client device 152 to monitor the positional information of the delivery person 148. When the GPS positional information of the client device 152 indicates that the delivery person 148 is within proximity to the residential facility 102, such as 1 mile from the residential facility 102, for example, the control unit server 104 can transmit a message 146 to the client device 152 of the delivery person 148. The message 146 includes an indication of whether the residential facility 102 includes pets, the number of pets in the residential facility 102, the type of each of the pets, and an indication as to whether each of the pets have been restrained. For instance, the message 146 can include a status that the residential facility 102 does include pets; the pets include two dogs and a cat; and, a status 150 that indicates the pets have been restrained. In some implementations, the delivery person 148 can provide an indication to the control unit server 104 that he or she is within proximity to the residential facility 102. For instance, the delivery person 148 can provide an indication via client device 152 that he or she is approaching the driveway or front door 118 of the residential facility 102 to deliver the package 151.

In some implementations, the delivery person 148 can confirm whether each of the pets in the residential facility 102 has been restrained. For instance, the delivery person 148 can check the backyard 129 of the residential facility 102 before entering the front door 118 of the residential facility 102. In another instance, the delivery person 148 approaches the front door 118 of the residential facility 102 and can determine if each of the pets have been restrained. For example, if the dog 128 is not restrained, the delivery person 148 may be able to hear the dog 128 barking near the inside of the front door 118. Additionally, if the residential facility 102 includes one or more windows, the delivery person 148 may detect other dog 126 or dog 128 in the windows unrestrained. In other instances, the delivery person 148 may not detect whether the one or more pets are restrained until entering the residential facility 102.

In some implementations, the control unit server 104 provides a status to the client device 152 of the delivery person 148 indicating that each pet is restrained. The delivery person 148 can indicate to the control unit server 104 through an application on the client device 152 that he or she requests to opt in to receiving the video feed to verify that each pet is in fact restrained. For instance, the delivery person 148 can indicate that he wishes to view the video feed from each of the cameras 110 monitoring each of the pets in the residential facility 102. In response, the control unit server 104 requests live video feed from each of the cameras 110 in the residential facility 102, receives each live video feed, and provides each of the live video feed to the client device 152 for the delivery person 148's verification. In other implementations, the delivery person 148 can indicate to the control unit server 104 through the application on the client device 152 that he or she requests to opt in to receiving the video feed to verify a select number of pets are restrained. For example, the delivery person 148 may only care to see the video feed from camera 111 viewing the crate 122 and not the camera 111 facing the backyard 129. This may be the case when the delivery person 148 will only enter the residential facility 102 and not the backyard 129.

In some implementations, if the video feed shows the delivery person 148 that at least one of the pets is not restrained in residential facility 102, the delivery person 148 can decline to enter the residential facility 102. In particular, the delivery person 148 can drop the package 151 off in front of the front door 118 and leave the residential property 102 without indicating to the control unit server 104 that he or she declines to enter the residential facility 102. In other implementations, the delivery person 148 may provide an indication to the control unit server 104 that he or she declines to enter the house and will leave the package 151 in front of the front door 118. Alternatively, if the video feed shows the delivery person 148 that all of the pets are indeed restrained, the delivery person 148 provides an indication to the control unit server 104 that he or she will enter the residential facility 102 and leave the package 151 inside. Each of these indications is provided to the client device 136 of the property owner 130 to inform of the delivery person 148's decision.

In some implementations, the control unit server 104 can instruct the delivery person 148 to deliver the package 151 to a specific location. For instance, the control unit server 104 can provide an indication to the client device 152 of the delivery person 148 to deliver the package 151 to the garage if a pet is not restrained in the residential facility 102. In another example, the control unit server 104 can instruct the delivery person to deliver the package 151 to the outside of the front door 118. In other implementations, the delivery person 148 can deliver the package 151 to the garage if he or she notices that at least one of the pets in the residential facility 102 is unrestrained.

In some implementations, the control unit server 104 can instruct the delivery person 148 to deliver the package 151 to a specific location if the residential facility 102 is disarmed. For example, if the arm profile signature profile is not set when the delivery person 148 is detected within proximity of the residential facility 102, the control unit server 104 can provide an indication to the client device 152 of the delivery person 148 to leave on a porch in front of the front door 118. In another implementation, the control unit server 104 can instruct the delivery person 148 to deliver the package 151 to a specific location if minors or elderly occupy the residential facility. In this instance, the minors and elderly are separate from the property owner 130.

In some implementations, the control unit server 104 can instruct the delivery company and the delivery person 148 to withhold delivering the package 151 when the property owner 130 is on vacation. For instance, if property owner 130 sets the signature profile to vacation mode for the residential facility 102, the control unit server 104 will provide an indication to the delivery company and the delivery person 148 to not deliver the package 151. This ensures the package will be safe if the delivery person 148 decided to leave the package 151 on the front porch of the residential facility 102 and the property owner 130 will not return for some time.

The control unit server 104 can provide likely homes of the property owner 130 to the delivery company and delivery person 148 for packages that require a signature. For instance, if the control unit server 104 detects that property owner 130 is home Monday through Friday from 6 PM to 8 AM and home Saturday and Sunday all day, then the control unit server 104 can share this information to the delivery company and the delivery person 148. This will help the delivery company determine the most likely times to send the delivery person 148 to residential facility 102 to deliver the package and at the same time receive a signature from the property owner 130.

In some implementations, the control unit server 104 unlocks the front door 118 upon detecting that the delivery person 148 is within proximity to the residential facility 102. By unlocking the front door 118, the delivery person 148 can place the package inside the residential facility 102. However, upon entering the residential facility 102, the delivery person 148 can determine that at least one of the one or more pets are not restrained. In some implementations, the control unit server 104 may not allow the delivery person 148 to deliver the package 151 inside the residential facility 102 if the front door 118 includes a battery lock that has a low battery level. For example, if the front door level has a high battery voltage, then the control unit server 104 will allow the delivery person 148 to enter the residential facility 102 to enter the residential facility 102 and deliver the package 151 inside. Otherwise, the control unit server 104 may instruct the delivery person 148 to deliver the package 151 to a specific location outside the residential facility 102 because the front door lock may not relock itself if the delivery person 148 were to enter. In some implementations, the control unit server 104 can instruct the delivery person to deliver batteries for the front door lock if the battery lock level is low along with the package 151.

During stage (E), the delivery person 148 can provide an indication to the control unit server 104 indicating whether the pets have in fact been restrained. For example, the delivery person 148 can interact with the client device 152 to provide an indication that at least one of the pets have in fact been restrained. In some implementations, the delivery person 148 can indicate which of the pets were not restrained on the client device 152. For example, the delivery person 148 can indicate that the dog 128 was found outside the crate 122. In other implementations, the delivery person 148 can indicate that the cat 124 was found in the bedroom and that the other dog 126 was found in the backyard 129. If the delivery person 148 provides an indication to the control unit server 104 that at least one of the pets are unrestrained, the delivery person 148 can leave the package 151 outside the front door 118 and decline to enter the residential facility 102. In particular, the delivery person 148 can provide an indication through the client device 152 that he or she declines to enter the residential facility 102 and that the package 151 is left outside the front door 118. For instance, the client device 152 may provide a message box for the user to type in this indication to provide to the control unit server 104. In other implementations, the client device 152 may provide a list of items for the delivery person 148 to check that indicates whether the pets were restrained and where the delivery person 148 placed the package 151.

The control unit server 104 can update a machine-learning model or rule that was used to determine whether a pet has been restrained based on sensor data and stored data indicating a pet has been restrained. The control unit server 104 can use a machine-learning model to detect whether one or more pets have been restrained in the monitored property. The machine-learning model can be based on sensor data provided from the sensors in the monitored property 102, images and/or media from the cameras in the monitored property 102, and stored data from a delivery person or a property owner indicating the pets have indeed been restrained. Additionally, the control unit server 104 can retrain the machine-learning model based on an incorrect prediction made by the machine-learning model, such as, an incorrect characterization of pets restraining. The machine-learning model can be trained to ensure that prediction is more accurate based on similar sensor and media data at a subsequent time. Alternatively, the control unit sever 104 may use a role that analyzes whether the number of pets have been restrained, such as if the digital lock mechanism 123 has been locked and the smart collar 127 is located within a location of the crate 122, the pet 128 or pet 126 is deemed to be restrained.

In some implementations, the control unit server 104 receives the confirmation indication 153 from the client device 152. If the control unit server 104 determines that the indication confirms that all pets have been restrained and the package 151 was successfully delivered inside the residential facility 102, then the control unit server 104 can provide an indication 153 to the client device 136 of the property owner 130 that a package 151 has been delivered inside the residential facility 102.

In some implementations, the control unit server 104 receives an indication 153 from the client device 152 that indicates not all pets were restrained and a package 151 was delivered to the outside of front door 118. The control unit server 104 can provide this indication 153 to the client device 136 of the property owner 130 that the package 151 is outside the front door 118 and at least one of the pets is not restrained. This can prompt the property owner 130 to quickly return to the residential facility 102 to ensure that the pet that is not restrained, such as the other dog 126, has not fled the residential facility 102.

The operations of stages (A) to (E) illustrate the monitoring of a pet during an unattended delivery of a package, such as package 151. The control unit server 104 can repeat the operations of stages (A) to (E) for multiple residential facilities and perform these stages in any order.

Figure 2A:
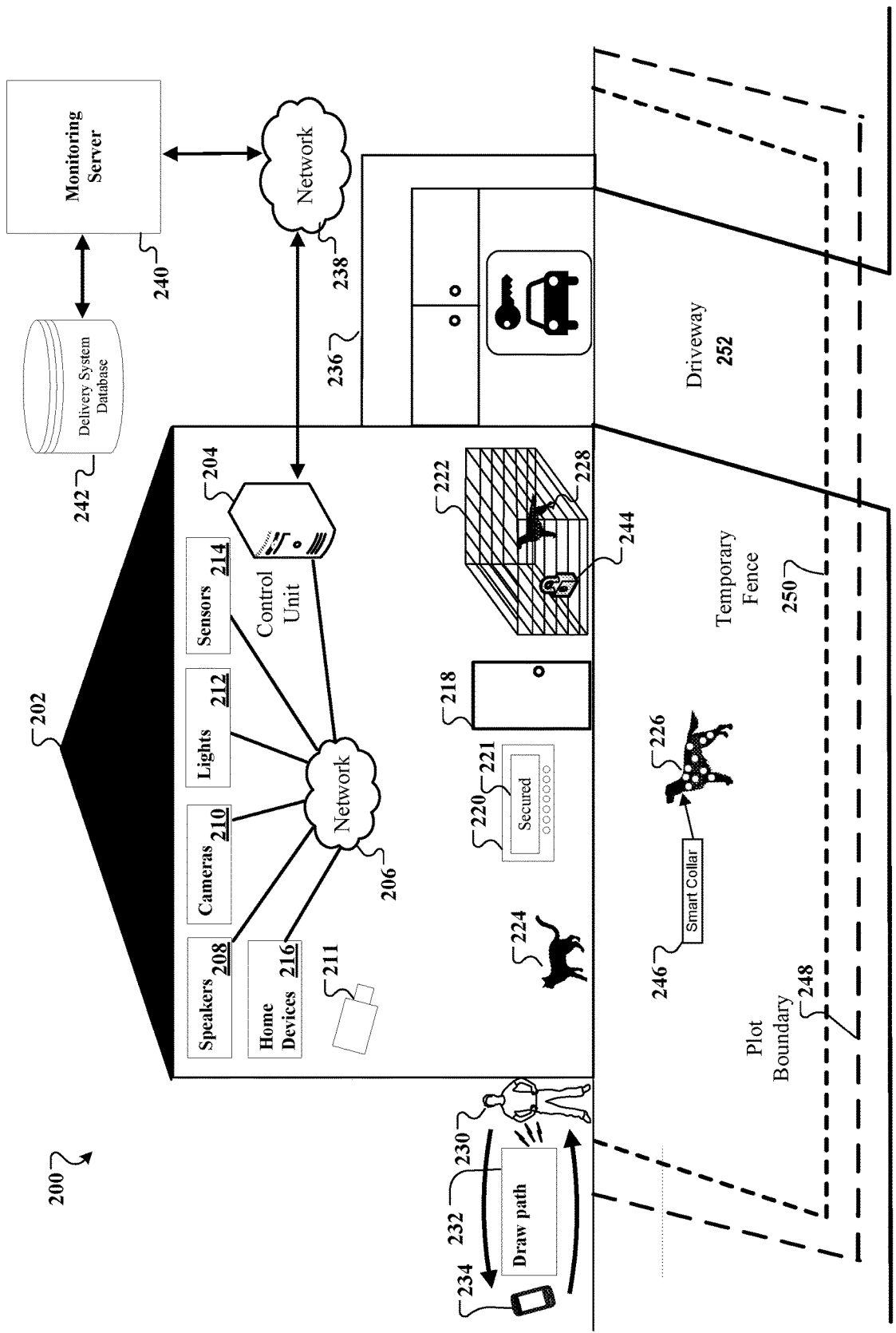
FIG. 2A is a context diagram of an example system of an integrated security environment for outdoor pet management during deliveries.

FIG. 2A is a context diagram of an example system 200 of an integrated security environment for outdoor pet management during deliveries. System 200 is similar to system 100. System 200 additionally includes a plot boundary 248 and a temporary fence 250 that restrains movement of one or more pets located within the monitored property 202. In particular, the temporary fence 250 is a virtual fence that can be monitored or not monitored by the control unit server 204. If the temporary fence 250 is active, the smart collar 246 on pet 226 may vibrate and issue a noise indicating to the pet 226 that a safe zone has been generated. If the smart collar 246 detects it has intersected with the plot boundary 248, the smart collar 246 may shock the pet 226 indicating to the pet 226 to back away from the plot boundary 248.

In some implementations, the plot boundary 248 can include a wire found at the monitored property 202 and the temporary fence 250 can include a separate wire found at the monitored property 202. Both wires can be buried at a particular depth at the monitored property 202. Alternatively, the wires can exist on top of the yard at the monitored property 202. The wires can surround the circumference of the monitored property 202, including at least the front yard, the backyard, and the side yards. Alternatively, the wires can cover a portion of the monitored property 202, such as the basement, living room, or front yard of the monitored property 202. If the plot boundary 248 and/or temporary fence are found within the home of the monitored property 202, the wires can be found within, on, above, or below the walls of the monitored property 202. The wire corresponding to the temporary fence 250 is typically within the enclosure of the wire corresponding to the plot boundary 248.

The wires are typically provided with power from the monitored property 202 (such as, from an electrical outlet) and as a result, the wires generate radio signals. The electricity flowing through the wires generates the radio signals. The radio signals interact with the smart collar 246, and as a result, the smart collar 246 provides either a vibration, noise, a shock, or a combination of each to the pet 226 in response to interacting with the radio signals. For example, the smart collar 246 can provide a vibration and noise in response to the control unit server 204 activating the temporary fence 250. In this example, the smart collar 246 can provide a shock and a noise in response to crossing the plot boundary 248.

In some implementations, the plot boundary 248 can be an invisible boundary monitored by the control unit server 104. Laying wire for fencing can be expensive, so to prevent increasing the cost of a pet fence, the invisible boundary provides a virtual safe zone. In this case, the plot boundary 248 can correspond to GPS coordinates around the monitored property 202. The control unit server 104 can store GPS coordinates corresponding to the location of the plot boundary 248. As the smart collar 246 moves around the monitored property 202, the smart collar 246 can provide its GPS coordinates to the control unit server 204 at a predetermined rate, such as every second, 2 seconds, or 5 seconds, for example.

During enforcement of the invisible plot boundary 248, the control unit server 204 can compare the received GPS coordinates from the smart collar 246 to the GPS coordinates of the invisible plot boundary 248. If the control unit server 204 determines that the smart collar 246 intersects with the invisible plot boundary 248, the control unit server 204 transmits an instruction to the smart collar 246 to provide a shock to the corresponding pet 226. Similar functionality occurs if the temporary fence 250 is an invisible boundary. The control unit server 204 transmits an instruction to the smart collar 246 to provide a noise and vibrate to warn the corresponding pet 226 if the temporary fence 250 is active. In some implementations, the temporary fence 250 becomes active when the control unit server 204 generates a safe zone at the monitored property 202. In other implementations, the temporary fence 250 is active if the property owner 230 decides to include multiple fences on the monitored property 202. For example, the temporary fence 250 can serve as a warning to the pet 250 that the pet is close to the plot boundary 248, where the pet will be shocked. Alternatively, the monitored property 202 may only include the temporary fence 250 or the plot boundary 248, where having just one of the fences may shock the pet 226 should the pet intersect with the fence boundary.

In some implementations, the property owner 230 can define the invisible boundary for the plot boundary 248 and the temporary fence 250. During a setup mode, the smart collar 246 can provide an indication to the control unit server 204 that the smart collar 246 is recording path data. The property owner 230 can hold the smart collar 246 and traverse a path around the monitored property 202, e.g., such as around the circumference of the yard, such that the path taken defines GPS coordinates of a particular fence. For example, the property owner 230 can traverse the plot boundary 248 (as shown in system 200) with smart collar 246 in hand to generate the invisible boundary of the plot boundary 248. The property owner 230 can similarly walk the path with the smart collar 246 in hand to generate the invisible boundary for the temporary fence 250. Similarly, the property owner 230 can walk the path for the safe zone of the temporary fence 250, as described below. The smart collar 246 can transmit GPS coordinates of the recorded path data to the control unit server 204. The control unit server 204 can receive and record the path data from the smart collar 246. The property owner 230 can indicate through his client device 234 whether the recorded path data corresponds to the temporary fence 250 or the plot boundary 248.

The property owner 230 can also indicate through a smart application on his/her client device 234 the path of the plot boundary 248 and the temporary fence 250. The smart application can display a map of the monitored property 202. The property owner 230 can draw on the map 232 to indicate the invisible boundary of the plot boundary 248 and the temporary fence 250. The property owner 230 may use his or her fingers to draw the boundaries on the map or may speak to the client device 234 regarding how to draw on the map. The client device 234 can then transmit the annotated map to the control unit server 204 for further monitoring. The control unit server 204 can translate the annotations on the map to GPS coordinates. The translated GPS coordinates become the new plot boundary 248 or temporary fence 250 coordinates (based on user selection) that the control unit server 204 monitors in comparison to the smart collar 246. If the control unit server 204 detects that the smart collar 246 crosses the translated GPS coordinates of either the plot boundary 248 or the temporary fence 250, the control unit server 204 issues a notification accordingly.

In some implementations, the temporary fence 250 may be found within the plot boundary 248. The temporary fence 250 may be active when the property owner 230 or the control unit server 204 decides to create a safe zone. Alternatively, the temporary fence 250 can be active to ensure the pet 226 has an additional warning before being shocked by the plot boundary 248. When the temporary fence 250 is active, the smart collar may vibrate, buzz, and/or beep, or any of the combination, to provide a cue to the pet 226 to avoid the safe zone. Additionally, the control unit server 204 may use other cues to indicate to the pet 226 to avoid the safe zone. For example, the control unit server 204 may flash one or more lights 212 at the monitored property 202 to indicate to the pet to avoid the safe zone. A property owner 230 may also place white flags or other markers surrounding the temporary fence 250 and including the safe zone during initial training of the pet 226. These flags or markers can be removed from the ground when the temporary fence 250 is active. Additionally, the smart collar 246 may buzz as the pet 226 approaches the temporary fence 250. Once the temporary fence 250 is turned off, the buzzing, vibrations, noise, and flashing lights can also be turned off.

The safe zones can be defined by the property owner 230 and stored in the control unit server 204, the smart collar 246, the monitoring server 240, or each. The safe zones can be changed through the property owner 230's smart home application on his/her client device 234. In particular, the safe zones, the temporary fence 250, and the plot boundary 248 can be adjusted in real-time using the smart home application.

The temporary fence 250 indicates a safe zone has been created that pets need to avoid. For example, this safe zone can be on the driveway 252. The safe zone allows a visitor to move into without interference from the pet 226. Additionally, the temporary fence 250 can be created to provide additional redundancy for the pet to avoid being shocked when intersecting with the plot boundary 248. As illustrated in system 200, a distance can exist between the temporary fence 250 and the plot boundary 248. The distance allows for ample space for the pet 226 to determine that it may be shocked should it move closer towards the plot boundary 248.

In some implementations, when the pet 226 crosses the temporary fence 250, the smart collar 246 corresponding to the pet 226 vibrates and makes noise indicating to the pet 226 that the plot boundary 248 is within proximity to the pet 226's location. As the pet 226 moves closer to the plot boundary 248 after crossing the temporary fence 250, the smart collar 246 may increase its vibration amount and an increase its noise, signaling to the pet 226 that its smart collar 246 is about to provide a shock once the smart collar crosses the plot boundary 248. If the pet 226 continues to move towards the plot boundary 248 and intersects the plot boundary 248, the pet 226 is shocked.

In some implementations, the system 200 further includes a garage 236 connected to the monitored property 202 that allow users to park their vehicles. For example, property owner 230 may drive his vehicle and park into the garage 236 through the driveway 252. The temporary fence 250 and the plot boundary 248 may cover the area of the driveway 252 when no cars are approaching. As further described below, the temporary fence 250 and the plot boundary 248 may adjust its boundaries in response to determining a car is approaching the monitored property 202 to ensure safety of the pets at the monitored property 202.

Figure 2B:
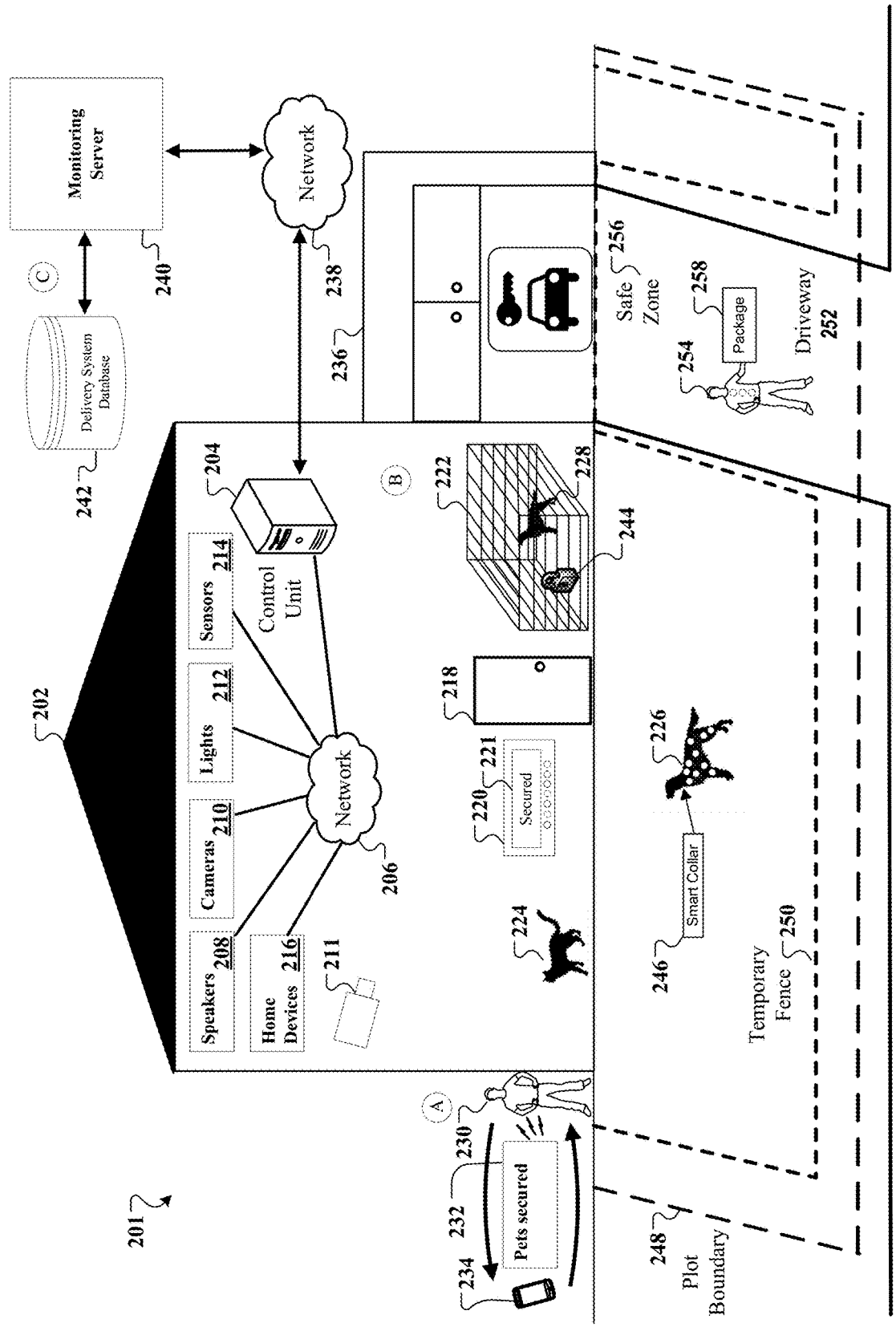
FIG. 2B is another context diagram of an example system of an integrated security environment for outdoor pet management during deliveries.

FIG. 2B is another context diagram of an example system 201 of an integrated security environment for outdoor pet management during deliveries. System 201 is similar to systems 200 and 100. System 201 illustrates the temporary fence 250 adjusting its boundaries in response to a delivery person 254 delivering a package 258 to the monitored property 202. This scenario applies in situations where the temporary fence 250 is an invisible boundary as stored by the control unit server 204. The plot boundary 248 can be a wire in the ground or an invisible boundary.

In some implementations, the control unit server 204 adjusts one or more boundaries of the temporary fence 250 to allow for movement into the monitored property 202 while providing safety to the pets within the monitored property 202. For example, the control unit server 204 can adjust the one or more boundaries of the temporary fence 250 to create a safe zone 256 within the monitored property 202. The safe zone 256 allows an outside individual to move into the monitored property 202 without being disrupted or interfered by the pets, such as pet 226. The safe zone 256 is an area in which the pets are not to enter and by avoiding, ensure their safety. If a pet, such as pet 226, tries to move into the safe zone 256, the control unit server 204 may issue a vibration and noise instruction to the smart collar 246 of the pet 226.

Alternatively, the control unit server 204 may issue a vibration and noise instruction to the smart collar 246 if the temporary fence 250 is active. This vibration and noise instruction indicates to the pet 226 to back away from the safe zone 256. For example, if a car is moving towards the monitored property 202 and the control unit server 204 detects that the car is coming to the monitored property 202, the control unit server 204 can adjust the boundaries of the temporary fence 250 to create a safe zone 256 for the car to move into without interfering with the pets of the monitored property 202. If the pet 226 enters the safe zone 256, the control unit server 204 may issue a command to the smart collar 246 to shock the pet 226. If the pet 226 exits the safe zone 256, the control unit server 204 may issue a command to the smart collar 246 to stop shocking the pet 226. In some implementations, if the pet already exists within the safe zone 256 before and after the control unit server 204 generates the safe zone 256, the control unit server 204 can issue a shock to the pet 226 to immediately exit the safe zone 256. Once the pet 226 exits the safe zone, the control unit server 204 instructs the smart collar 246 to stop shocking the pet 226. Alternatively, the smart collar 246 (attached to the pet 226) detects the location of the pet 226 with respect to the location of the safe zone 256 and can issue the vibration, buzzing, and/or shock to the pet 226. If the pet 226 re-enters the safe zone 256 after exiting the safe zone 256, the smart collar 246 will issue another shock to the pet 226.

In some implementations, the determination whether to vibrate, shock, buzz, and beep the smart collar 246 to provide cues to the pet 226 can be performed by the smart collar 246. Without the use of the control unit server 204, the smart collar 246 can house the intelligence and GPS activities to determine a location of the smart collar 246 in comparison to the location of the virtual boundaries, and in response, deliver the notification to the pet 226. In some implementations, the monitoring server 240 may communicate with the smart collar 246 and perform the functionality for issuing notifications to the smart collar 246, similar to the control unit server 204.

In some implementations, the control unit server 204 may retrieve data from various sources of the monitored property 202 when determining whether to alter or adjust the boundaries of the temporary fence 250. In particular, the control unit server 204 can retrieve data from video analytics, connected car integration, delivery service integration, and security sensors. Using video analytics, the control unit server 204 can use one or more video cameras 210 that monitor areas that cover and exist within proximity to the temporary fence 250 and the plot boundary 248. For example, the video camera 211 can record media, e.g., video and images, of the front yard of the monitored property 202 and monitor objects that are found within the recorded media. The control unit server 204 can execute object and/or facial recognition on the recorded media to determine if a known object is recognized in the recorded media. For example, the control unit server 204 may recognize property owner 230 approaching the monitored property 202, a relative of the property owner 230, a delivery person 254, a delivery truck corresponding to the delivery person, a vehicle corresponding to the property owner 230, or a vehicle corresponding to a relative of the property owner 230. Other examples of recognized objects are also possible.

Additionally, the control unit server 204 can obtain data from security sensors at the monitored property 202 to recognize the property owner 230 and others. For example, the control unit server 204 can obtain data from motion sensors and thermal imaging sensors that indicate a user is moving within proximity to the monitored property 202. The control unit server 204 can use the sensor data in conjunction with the data from the video cameras to recognize individuals at the monitored property 202, and recognize individuals approaching the monitored property 202.

In response to the control unit server 204 recognizing a person or object from the recorded media, the control unit server 204 can adjust the boundaries of the temporary fence 250 to create a safe zone 256 for the recognized person or object. In some implementations, the control unit server 204 can rely on delivery service integration independent of or in conjunction with the video analytics to aid in determining whether to adjust the boundaries of the temporary fence 250. In particular, the control unit server 204 may communicate with the delivery system database 242 to determine whether the monitored property 202 is expected to receive a package 258 from a delivery person 254. The control unit server 204 can determine the delivery company, the package, and a time for delivery of the package 258. Thus, the control unit server 204 can monitor its current date and time, compare to expected delivery date and time, and can use its video analytics around the expected delivery date and time to search for indication of a delivery person 254 or delivery vehicle. In response to detecting the delivery person 254 or the delivery vehicle, the control unit server 204 can activate the temporary fence 250 in system 201 with the safe space 256. The safe space 256 ensures that the pet 226 does not interfere with the delivery person 254 and ensures the pet 226 is not injured by the delivery person 254's vehicle. In response to activating the temporary fence 250 with the safe space 256, the smart collar 246 may buzz and vibrate, signaling to the pet 226 to avoid the safe space 256.

In one use case scenario regarding how this system can work, a UPS delivery is scheduled to deliver a package to Jane (e.g., property owner 130) at the monitored property 202 at 2:00 PM ET on Tuesday. The control unit server 204 receives an indication from UPS (e.g., the delivery system database 242) regarding the expected delivery date and time. The control unit server 204 provides a notification to Jane's client device 234 indicating that a package will be delivered and requesting for UPS to drop off the package 258 in the safe zone 256. Jane approves of the request to drop the package in the safe zone 256 considering Jane's pet 226 dog will be in the front yard during the expected delivery time. The control unit server 204 provides the notification to UPS (e.g., the delivery system database 242) to drop the package off in the safe zone 256.

Continuing with the UPS example above, UPS provides a notification to the control unit server 204 that the delivery of package 258 is imminent. The control unit server 204 receives this notification and analyzes its recorded media to determine if it recognizes the delivery person 254 or delivery vehicle approaching the monitored property 202. If the control unit server 204 does recognize the delivery person or the vehicle, the control unit server 204 activates the temporary fence 250 to create a safe zone 256 in the driveway 252. Alternatively, the control unit server 204 can adjust the temporary fence 250 from system 200 to the temporary fence 250 in system 201 with the enabled safe zone 256. Additionally, the control unit server 204 provides a notification to the smart collar 246 of the pet 226 to vibrate and ring, alerting the pet 226 that the pet will be shocked if the pet moves into the safe zone 256.

The control unit server 204 can determine whether the delivery person 254 has delivered the package 258. In particular, the control unit server 204 can use video analytics and notification from the property owner 230 to determine whether the package 258 was delivered. In particular, the control unit server 204 can use object recognition to determine whether a package was delivered in the safe zone. Additionally, the control unit server 204 can provide an indication to the client device 234 of the property owner 230 that includes media of the package 258 in the safe zone 256. The property owner 230 can provide a response to the indication to the control unit server 204 that indicates the package 258 has been delivered. Additionally, the control unit server 204 can store an indication that the package was delivered.

In response to the delivery person 254 delivering the package 258 to the safe zone 256, the control unit server 204 can use video analytics from the one or more cameras 210 to monitor the delivery person 254 or the corresponding delivery vehicle leaving the monitored property 202. If the control unit server 204 determines that the delivery person 254 or the corresponding delivery vehicle is in fact leaving the monitored property 202 (e.g., through facial or object recognition), then the control unit server 204 can readjust the boundaries of the temporary fence 250 back to the boundaries of the temporary fence 250 shown in system 200. Alternatively, the control unit server 204 can deactivate the temporary fence 250 so as to leave only the plot boundary 248.

In some cases, the control unit server 204 can automatically adjust the boundaries of the temporary fence 250 based on a notification from the delivery system, without relying on video analytics. Additionally, once the control unit server 204 adjusts the temporary fence 250 to remove the safety zone 256, the control unit server 204 instructs the vibrating and ringing of the smart collar 246 to cease. This indicates to the pet 226 that it is safe now to move into the previously safe zone area 256.

In another use case, Jim, a property owner 130, is returning from a trip away from the monitored property 202. Since Jim is the property owner 130 of the monitored property 202, Jim's vehicle is pre-configured to be recognized and identified by the control unit server 204. Thus, as Jim's vehicle returns from the outing, a camera 211 located at the monitored property 202 provides recorded media of Jim's vehicle to the control unit server 204. The control unit server 204 recognizes Jim's vehicle in the recorded media. Additionally, the control unit server 204 can use the video analytics to determine that Jim's pet 226 "Lulu" is playing in the front yard as Jim's vehicle approaches the monitored property 202. Thus, the control unit server 204 adjusts the boundaries of the temporary fence 254 to prevent Jim's dog "Lulu" from running in front of Jim's car as it pulls in the driveway. Thus, in response to the control unit server 204 adjusting the boundaries of the temporary fence 254, the control unit server 204 transmits an instruction to the smart collar 246 to vibrate, buzz, or ring, or a combination of these, as a cue, to indicate to Lulu that the driveway (safe zone 252) is off limits. Once the car is parked in the driveway, the car can communicate with the control unit server 204 to indicate that it is parked.

The control unit server 204 includes connected car integration that allows for receiving notifications from the vehicle. For example, the notifications can indicate the status of the vehicle, such as park, reverse, drive, powered on, powered off, or errors corresponding to the vehicle. The control unit server 204 can provide these notifications from the vehicle to the client device 234 of the owner 230. Continuing with the example from above, once the control unit server 204 notices that the vehicle is parked, the control unit server 204 adjusts the temporary fence 254 back to the temporary fence 250. Thus, Lulu can then greet Jim with enthusiastic tail wagging without interfering with Jim's vehicle.

In another use case, Dave, property owner 130 of monitored property 202, has an electric fence, such as temporary fence 254, for his pet 226. Dave has to remember to deactivate or remove the smart collar 246 when taking his dog (e.g., pet 226) for a walk. As Dave proceeds to take his dog for a walk, Dave forgets to remove the smart collar 246 from the monitored property 202. The camera 211 monitors the area where Dave proceeds to take the dog 226 for a walk by recording media and providing the media to the control unit server 204. The control unit server 204 identifies that Dave is taking his dog for a walk and additionally recognizes that the smart collar 246 is still attached to the pet 226. The control unit server 204 can determine that the dog is expected to be shocked since the smart collar 246 has not yet been removed from the pet 226.

In doing so, the control unit server 204 determines that the owner Dave has active "control" of his dog. The control unit server 204 can use facial and object recognition to determine that the dog is on a leash and that the leash is in Dave's hand. In response to determining that Dave has active control over his dog, the control unit server 204 notifies Dave that his dog is about to be shocked by crossing the plot boundary 248. The control unit server 204 notifies Dave through his client device 234 and powers down the plot boundary 248 in order to ensure the pet 226 is not shocked. Dave is then additionally notified that the plot boundary 248 has been powered down. After Dave takes his dog on the walk and returns back to the monitored property 102, the plot boundary 248 and the temporary fence 254 can be powered on in a variety of ways. In one manner, Dave can indicate through his client device 234 to power on the plot boundary 248 and the temporary fence 254 once the pet 226 is within the monitored property. In another manner, the control unit server 204 determines that the pet 226 is back within the monitored property 202 and powers on the plot boundary 248 and the temporary fence 254, in response.

FIG. 3 is a flowchart of example processes for providing an alert based on a determination that a particular event related to the monitored pet status has occurred. Generally, the process 300 includes receiving an indication that a resident will be receiving a delivery; determining that the resident will likely be away from the property during an expected delivery time; providing an indication to the resident to restrain pet in response to determining the resident will likely be away from the property during the expected delivery time; receiving an indication from the resident that the pet has been properly secured at the property; and, providing an indication to a delivery person that the pet has been restrained in response to detecting that the delivery person is within proximity to the property.

During 302, the control unit server 104 receives an indication that a resident will be receiving a delivery. For instance, the control unit server 104 can determine that property owner 130 is expected to receive a package 151. In particular, the control unit server 104 can determine if the property owner 130 placed an order for delivery of a package 151 through the property owner 130's smart home application on client device 136. In other implementations, the control unit server 104 can request a response from property owner 130 through client device 136 that asks if he/she is expecting to receive a package 151 today. In other implementations, the control unit server 104 can communicate with the delivery system database 144 over the network 140 and through the monitoring server 142 to determine if property owner 130 placed a delivery order for package 151 through any of the delivery companies. In addition, the control unit server 104 can determine from communicating with the delivery system database 144 whether any of the delivery companies plan to deliver a package to the residential facility 102.

During 304, the control unit server 104 determines that the resident will likely be away from the property during an expected delivery time. For instance, the control unit server 104 can determine that the property owner 130 is away from the residential property 102 during the times of 8:00 AM and 4:00 PM during Monday through Friday. The control unit server 104 can determine that the property owner 130 sets the arm home signature profile at 8:00 AM and turns off the arm home signature profile at 4:00 PM each day of the week. In addition, the control unit server 104 utilizes recognition software in the video camera 111 to determine that the property owner 130 is walking away from the residential facility 102 around 8:00 AM and walks towards the residential facility 102 at 4:00 PM.

In some implementations, the control unit server 104 can determine that a delivery company plans to deliver a package 151 to the residential facility 102 during a specified time of the day. For instance, the control unit server 104 can retrieve the contact information from the delivery system database 144 for the delivery company that plans to deliver the package 151 to the residential facility 102. The control unit server 104 can contact the delivery company using the delivery company's contact information (e.g., telephone number, email address, URL address, etc.) to request for a delivery time. In other implementations, the control unit server 104 can transmit a request to property owner 130's client device 136 to ascertain of the potential delivery time from the property owner 130. In some cases, the property owner 130 may be aware of the delivery time. In some implementations, the delivery company may transmit an indication to the control unit server 104 that they plan to deliver a package 151 to the residential property 102. As a result, the control unit server 104 may provide a notification to the client device 136 that indicates to the property owner 130 what package 151 is being delivered and an expected delivery time.

During 306, the control unit server 104 provides an indication to the resident to restrain pet in response to determining the resident will likely be away from the property during the expected delivery time. For instance, the control unit server 104 may determine that the number of pets found in the restrained locations is less than the number of pets living in the residential facility 102. In particular, this comparison indicates to the control unit server 104 that at least one of the pets living in the residential facility 102 is unrestrained. As a result, the control unit server 104 can transmit a notification 132 to the client device 136 that provides a message 134 to the property owner 130. As illustrated in the example of FIG. 1, the message 134 indicates to the property owner 130 to "restrain all pets before leaving" on client device 136.

In some implementations, the control unit server 104 can provide a message 134 to client device 136 that indicates which pet needs to be restrained. For example, if the camera 111 facing the cage 122 does not detect a pet within the cage 122, the control unit server 104 can provide a message 134 that indicates to the property owner 130 to "restrain dog in cage" on client device 136. In some implementations, the control unit server 104 can provide the message 134 to the display 121 of monitor 120. By providing the message 134 to the display 121, the property owner 130 can receive the message 134 in other forms if their client device 136 is turned off or not nearby.

During 308, the control unit server 104 receives an indication from the resident that the pet has been properly secured at the property. For instance, the property owner 130 provides an indication 138 to control unit 104 using client device 136 that all pets are restrained. The property owner 130 restrains each pet in either the backyard 129, the cage 122, a bedroom of the residential facility 102 and closes the bedroom door, or a garage of the residential facility 102. Once the property owner 130 properly restrains each of the pets, the property owner 130 interacts with the smart home application on the client device 136 to indicate that all of the pets are restrained. In particular, the client device 136 transmits a notification 138 that includes a message and a client device identifier to the control unit server 104.

During 310, the control unit server 104 provides an indication to a delivery person that the pet has been restrained in response to detecting that the delivery person is within proximity to the property. The control unit server 104 can transmit this indication to the client device of the delivery person 148 in response to detecting the proximity of the delivery person 148 to the monitored property 102. For instance, the control unit server 104 detects that the delivery person 148 is within proximity to the residential facility 102. For instance, the control unit 104 can receive an indication from the monitoring server 142 when the delivery person 148 is approaching the residential facility 102. The monitoring server 142 can remain in contact with the delivery company that provides an indication of an estimated arrival time for the delivery person 148 to arrive at the residential facility 102. Additionally, the delivery company may provide GPS positional information to the monitoring server 142 of the delivery person 148 so that the monitoring server 142 can track his or her location. In some implementations, the monitoring server 142 can provide the GPS positional information to the control unit server 104 for tracking the delivery person 148. For example, the GPS positional information can relate to latitudinal, longitudinal, and time information of client device 152 corresponding to the delivery person 148. The control unit server 104 can transmit the notification to the client device of the delivery person 148. Once the delivery person 148 delivers the package, the delivery person 148 can transmit a notification to the control unit server 104 that indicates a confirmation that the pets in the monitored property are indeed restrained. The control unit server 104 can then store a notification in its memory that its determination that the pet has been properly secured was in fact correct. This notification can help improve the control unit server 104's subsequent determination that a pet is restrained.

In some implementations, the control unit server 104 can track the GPS positional information of the delivery person 148 to detect when the delivery person 148 is within proximity to the residential facility 102. For example, the control unit server 104 can use the GPS positional information of the client device 152 to monitor the positional information of the delivery person 148. When the GPS positional information of the client device 152 indicates that the delivery person 148 is within proximity to the residential facility 102, such as 1 mile from the residential facility 102, for example, the control unit server 104 can transmit a message 146 to the client device 152 of the delivery person 148. The message 146 includes an indication of whether the residential facility 102 includes pets, the number of pets in the residential facility 102, the type of each of the pets, and an indication as to whether each of the pets have been restrained. For instance, the message 146 can include a status that the residential facility 102 does include pets; the pets include two dogs and a cat; and, a status 150 that indicates the pets have been restrained.

FIG. 4 is a flowchart of an example process 400 for configuring an adjustable pet fence at a monitored property based on a determination that a particular event related to the monitored pet status has occurred. Generally, the process 400 includes receiving an indication that a resident will be receiving a delivery at a monitored property; determining that a pet is located at the monitored property within a temporary fence during an expected delivery time; determine a likelihood that the delivery to the monitored property is imminent; in response to determining the likelihood that the delivery is imminent, adjust one or more boundaries of the temporary fence to generate a safe zone that provides safe delivery and restricts pet movement into the safe zone; detect that a package has been delivered at the monitored property through the safe zone; and in response to detecting that the package has been delivered, adjust the one or more boundaries of the temporary fence to remove the safe zone from the monitored property.

During 402, the control unit server 204 receives an indication that a resident will be receiving a delivery at a monitored property. For example, the control unit server 204 can determine that property owner 230 is expected to receive a package 258. In particular, the control unit server 204 can determine if the property owner 230 placed an order for delivery of a package 258 through the property owner's 234 smart home application on client device 234. In other implementations, the control unit server 204 can request a response from property owner 230 through client device 234 that asks if he/she is expecting to receive a package 258 today. In other implementations, the control unit server 204 can communicate with the delivery system database 242 over the network 238 and through the monitoring server 240 to determine if property owner 230 placed a delivery order for package 258 through any of the delivery companies. In addition, the control unit server 204 can determine from communicating with the delivery system database 242 whether any of the delivery companies plan to deliver a package to the monitored property 202. In response, the control unit server 204 can receive an indication from the delivery system database 242 that the property owner 230 is expected to receive a package today at a particular time, or on another day at a particular time. The control unit server 204 can notify the property owner 230 of the expected time of arrival of the package 258.

During 404, the control unit server 204 can determine that a pet is located at the monitored property within a temporary fence during an expected delivery time. In particular, the control unit server 204 can use video analytics (e.g., facial or object recognition) on the media recorded by the one or more cameras 210 to determine if a pet is located at the monitored property 202. For example, the control unit server 204 can analyze real-time video received from the camera 211 to determine whether a pet exists in the front yard of the monitored property 202. Additionally, the control unit server 204 can receive an indication from the client device 234 of the property owner 230 that indicates the pet is located within the temporary fence 250 of the monitored property 202. The control unit server 104 can also determine that the pet exists in a location where the safe zone will be generated or the control unit server 104 that the pet is unrestrained at the monitored property 102. The indication can include the type of pet and a location of the pet on the monitored property 202. For example, the control unit server 204 can receive an indication from the client device 234 that the dog 226 is located in the front yard of the monitored property 202.

During 406, the control unit server 204 determines a likelihood that the delivery to the monitored property 202 is imminent. For example, the control unit server 204 can retrieve data from video analytics, connected car integration, delivery service integration, and security sensors to determine whether the delivery is imminent. In particular, the control unit server 204 can communicate with the delivery system database 242 to determine whether the monitored property 202 is expected to receive a package 258 from a delivery person 254. The control unit server 204 can determine the delivery company, the package, and a time for delivery of the package 258.

Around the time the package is expected to be delivered, the control unit server 204 can monitor its current date and time, compare to expected delivery date and time, and can use its video analytics around the expected delivery date and time to search for indication of a delivery person 254 or delivery vehicle. In particular, the control unit server 204 can produce an a likelihood that indicates whether the delivery is imminent. The likelihood can be based on how close it is to the expected delivery date and time, tracking information corresponding to the delivery vehicle, and whether or not the delivery vehicle is found in the recorded media. In response to determining that the delivery is imminent, the control unit server 104 prepares to adjust the boundaries of the temporary fence 250.

During 408, in response to determining the likelihood that the delivery is imminent, the control unit server 104 adjusts one or more boundaries of the temporary fence 250 to generate a safe zone that provides safe delivery and restricts pet movement into the safe zone. In response to detecting delivery, the control unit server 204 adjusts one or more boundaries of the temporary fence 250 to allow for the delivery person 148 to safely deliver a package to the monitored property 202 while providing safety to the pets within the monitored property 202. For example, the control unit server 204 can adjust the one or more boundaries of the temporary fence 250 to create a safe zone 256 within the monitored property 202. The safe zone 256 allows an outside individual to move into the monitored property 202 without being disrupted or interfered by the pets, such as pet 226. The safe zone 256 is an area in which the pets are not to enter and by avoiding, ensure their safety. The control unit server 104 can adjust the one or more boundaries by changing the GPS coordinates of the temporary fence 250 to generate the safe zone. The safe zone can be placed at any area within the monitored properties. When generating the safe zones, the temporary fence 250 remains intact to the generated safe zones, as illustrated in system 201. Additionally, the control unit server 104 can generate multiple safe zones for various deliveries, such as within the home of the monitored property 202 and outside the monitored property 202.

If the control unit server 104 determines that the pet is unrestrained during the expected delivery time or found within the potential generated safe zone, the control unit server 104 can transmit a notification to the property owner 130 to restrain the identified pet. The control unit server 104 can also issue a shock to the smart collar 246 of the unrestrained pet to indicate to the pet to move to a restraining location (e.g., outside the safe zone 256 or to crate 222), as delivery is imminent. Once the control unit server 104 or the property owner 130 has verified that the pet is restrained (e.g., either through video recognition or receiving a notification from the property owner 130), the control unit server 104 can indicate to the delivery person 254 that it is safe to deliver the package 258. If the control unit server 104 determines that the pet is not restrained or not outside the safe zone, the control unit server 104 can indicate to the delivery person 254 to not deliver the package 258 as the pets in the monitored property 102 are not restrained. Alternatively, the control unit server 104 can indicate to the delivery person 254 that the pets are not restrained and if he/she wishes to deliver the package, enter the monitored property 102 with caution and at your own risk.

During 410, the control unit server 204 detects that a package has been delivered at the monitored property 202 through the safe zone. In particular, the control unit server 204 can use video analytics and request for a notification from the property owner 230 to determine whether the package 258 was delivered in the safe zone 256. In particular, the control unit server 204 can use object recognition to determine whether a package was delivered in the safe zone. Additionally, the control unit server 204 can provide an indication to the client device 234 of the property owner 230 that includes media of the package 258 in the safe zone 256.

During 412, in response to detecting that the package has been delivered, the control unit server 204 adjusts the one or more boundaries of the temporary fence 250 to remove the safe zone from the monitored property 202. The control unit server 204 can use video analytics and request a status from the property owner 230 to determine whether the package 258 was delivered. In particular, the control unit server 204 can use object recognition to determine whether a package was delivered in the safe zone. Additionally, the control unit server 204 can provide an indication to the client device 234 of the property owner 230 that includes media of the package 258 in the safe zone 256 to verify that the package 258 was indeed delivered.

Figure 5:
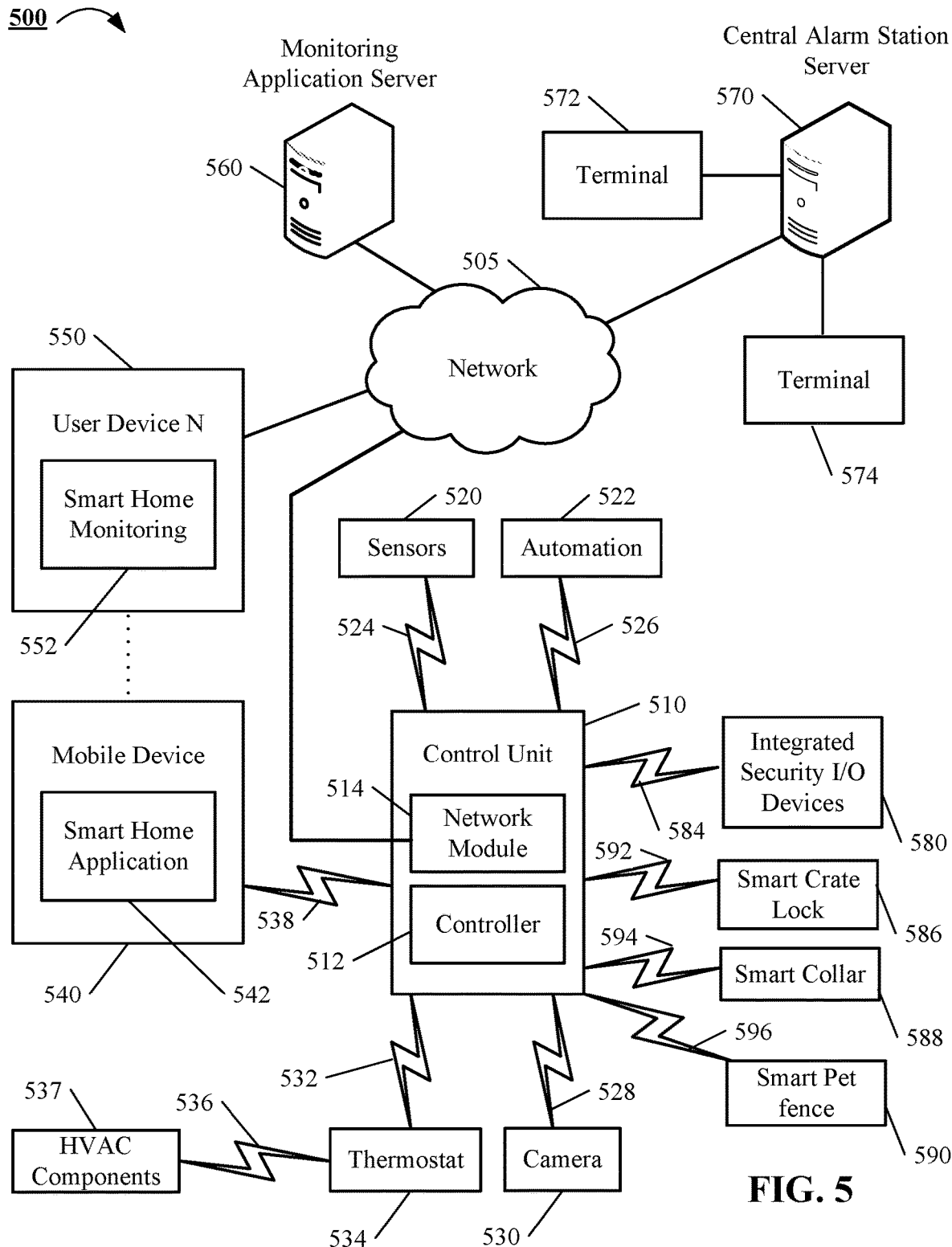
FIG. 5 is a block diagram of an example integrated monitoring server for monitoring a pet status during an unattended delivery at a residential facility that may utilize various security components.

FIG. 5 is a block diagram of an example integrated monitoring server 500 for monitoring a pet status during an unattended delivery at a residential facility that may utilize various security components. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VOIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the connected valve unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the connected valve unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a residential facility 102 monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the connected valve unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the connected valve unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the connected valve unit 510 and can control the environmental (e.g., temperature) settings based on commands received from the connected valve unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices 580 may include any type of device used to provide alerts based on received sensory data. For instance, the one or more control units 510 may provide one or more alerts to the one or more integrated security devices 580. Additionally, the one or more control units 510 may receive one or more sensory data from the sensors 520 and determine whether to provide an alert to the one or more integrated security devices 580.

The system 500 further includes a smart crate lock 586, a smart collar 588, and a smart pet fence 590. The smart crate lock 586 may include any type of device that locks around a crate, such as crate 122, and provides alerts based on received sensory data. For example, the received sensory data may include a lock status, an unlock status, and a broken lock while locked status. The smart collar 588 may include any type of device that locks around an animal that acts as a leash, harness, or collar for a pet. The smart collar 588 may act as a transmitter and provide a signal to the controller 512. The strength of the signal indicates the location of the smart collar 588, the direction of the smart collar 588, and the battery strength of the smart collar 588. In addition, the controller 512 can ping the smart collar 588 to see if it responds. The smart pet fence 590 may include any type of device that monitors a detection with a particular location and the smart collar 588 and provides alerts based on the detection. For example, the provided alert may include issuing a shock or vibration to the smart collar 588, or issuing an alert to the control unit 510 indicating of a detection with the smart collar 588s.

The sensors 520, the module 522, the camera 530, the thermostat 534, the smart crate lock 586, the smart collar 588, and the one or more integrated security devices 580 communicate with the controller 512 over communication links 524, 526, 528, 532, 584, 592, 594, and 596. The communication links 524, 526, 528, 532, 584, 592, 594 and 596, may be a wired or wireless data pathway configured to transmit signals from the sensors 520, the module 522, the camera 530, the thermostat 534, the smart crate lock 586, the smart collar 588, the smart pet fence 590, and the one or more integrated security devices 580 to the controller 512. The sensors 520, the module 522, the camera 530, the thermostat 534, the smart crate lock 586, the smart collar 588, the smart pet fence 590, and the one or more integrated security devices 580 may continuously transmit sensed values to the controller 512, periodically transmit sensed values to the controller 512, or transmit sensed values to the controller 512 in response to a change in a sensed value.

The communication links 524, 526, 528, 532, 536, 584, 592, 594 and 596 may include a local network. The sensors 520, the module 522, the camera 530, the thermostat 534, the smart crate lock 586, the smart collar 588, the smart pet fence 590, the one or more integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 510. In this example, the monitoring application server 560 may exchange electronic communications with the network module 514 included in the control unit 510 to receive information regarding events (e.g., alerts) detected by the control unit 510. The monitoring application server 560 also may receive information regarding vents (e.g., alerts) from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
detecting, by a monitoring system that uses one or more rules for analysis of sensor data for a zone with one or more first boundaries that define a portion of a property, an event at the property;
determining whether the event satisfies a zone boundary adjustment criteria;
in response to determining that the event does not satisfy the zone boundary adjustment criteria, determining to skip creating one or more updated boundaries for the zone by adjusting the one or more first boundaries; and
after determining to skip creating the one or more updated boundaries for the zone:
receiving sensor data for the zone; and
analyzing, using the one or more first boundaries and the one or more rules, the sensor data for the zone to determine whether to perform an action for the zone.

2. The method of claim 1, comprising performing the action for the zone using a result of the analysis of the sensor data for the zone that used the one or more first boundaries and the one or more rules.

3. The method of claim 1, wherein:
receiving the sensor data for the zone comprises receiving one or more images that each depict at least a portion of the zone defined by the one or more first boundaries; and
analyzing the sensor data comprises analyzing, using video analytics, the one or more images to determine whether to perform an action for the zone.

4. The method of claim 1, wherein analyzing the sensor data comprises:
determining, using the sensor data, a location of a pet at the property;
determining, using the one or more first boundaries, whether the location of the pet is within the one or more first boundaries; and
determining, using the one or more rules, to perform the action defined by at least one of the one or more rules in response to determining that the location of the pet is not within the one or more first boundaries.

5. The method of claim 1, wherein determining whether the event satisfies the zone boundary adjustment criteria comprises determining whether the event has a threshold likelihood of crossing one of the one or more first boundaries for the zone.

6. The method of claim 5, comprising determining whether a vehicle has the threshold likelihood of crossing one of the one or more first boundaries for the zone.

7. The method of claim 1, wherein determining whether the event satisfies the zone boundary adjustment criteria comprises determining whether the event occurred within a threshold distance to the zone.

8. The method of claim 1, wherein determining whether the event satisfies the zone boundary adjustment criteria comprises determining whether the event includes a predetermined object.

9. The method of claim 8, wherein determining whether the event includes the predetermined object comprises determining whether the event includes a known person.

10. The method of claim 1, wherein determining whether the event satisfies the zone boundary adjustment criteria comprises determining whether the event includes a predetermined object type.

11. The method of claim 10, wherein determining whether the event includes the predetermined object type comprises determining whether the event likely includes a delivery person.

12. A system comprising one or more computers and one or more storage devices on which are stored instructions that are operable, when executed by the one or more computers, to cause the one or more computers to perform operations comprising:
    detecting, by a monitoring system that uses one or more rules for analysis of sensor data for a zone with one or more first boundaries that define a portion of a property, an event at the property;
    determining whether the event satisfies a zone boundary adjustment criteria;
    in response to determining that the event does not satisfy the zone boundary adjustment criteria, determining to skip creating one or more updated boundaries for the zone by adjusting the one or more first boundaries; and
    after determining to skip creating the one or more updated boundaries for the zone:
    receiving sensor data for the zone; and
    analyzing, using the one or more first boundaries and the one or more rules, the sensor data for the zone to determine whether to perform an action for the zone.

13. The system of claim 12, the operations comprising performing the action for the zone using a result of the analysis of the sensor data for the zone that used the one or more first boundaries and the one or more rules.

14. The system of claim 12, wherein:
    receiving the sensor data for the zone comprises receiving one or more images that each depict at least a portion of the zone defined by the one or more first boundaries; and
    analyzing the sensor data comprises analyzing, using video analytics, the one or more images to determine whether to perform an action for the zone.

15. The system of claim 12, wherein analyzing the sensor data comprises:
    determining, using the sensor data, a location of a pet at the property;
    determining, using the one or more first boundaries, whether the location of the pet is within the one or more first boundaries; and
    determining, using the one or more rules, to perform the action defined by at least one of the one or more rules in response to determining that the location of the pet is not within the one or more first boundaries.

16. The system of claim 12, wherein determining whether the event satisfies the zone boundary adjustment criteria comprises determining whether the event has a threshold likelihood of crossing one of the one or more first boundaries for the zone.

17. The system of claim 16, the operations comprising determining whether a vehicle has the threshold likelihood of crossing one of the one or more first boundaries for the zone.

18. The system of claim 12, wherein determining whether the event satisfies the zone boundary adjustment criteria comprises determining whether the event occurred within a threshold distance to the zone.

19. The system of claim 12, wherein determining whether the event satisfies the zone boundary adjustment criteria comprises determining whether the event includes a predetermined object.

20. One or more non-transitory computer storage media encoded with instructions that, when executed by one or more computers, cause the one or more computers to perform operations comprising:
    detecting, by a monitoring system that uses one or more rules for analysis of sensor data for a zone with one or more first boundaries that define a portion of a property, an event at the property;
    determining whether the event satisfies a zone boundary adjustment criteria;
    in response to determining that the event does not satisfy the zone boundary adjustment criteria, determining to skip creating one or more updated boundaries for the zone by adjusting the one or more first boundaries; and
    after determining to skip creating the one or more updated boundaries for the zone:
    receiving sensor data for the zone; and
    analyzing, using the one or more first boundaries and the one or more rules, the sensor data for the zone to determine whether to perform an action for the zone.

* * * * *